(12) United States Patent
De Groot

(10) Patent No.: US 7,948,637 B2
(45) Date of Patent: May 24, 2011

(54) ERROR COMPENSATION IN PHASE SHIFTING INTERFEROMETRY

(75) Inventor: Peter De Groot, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 274 days.

(21) Appl. No.: 12/408,121

(22) Filed: Mar. 20, 2009

(65) Prior Publication Data

US 2010/0238455 A1 Sep. 23, 2010

(51) Int. Cl.
*G01B 9/02* (2006.01)
(52) U.S. Cl. ........................................... 356/512
(58) Field of Classification Search .......... 356/511–515, 356/519, 497, 489, 495
See application file for complete search history.

(56) References Cited

U.S. PATENT DOCUMENTS

| | | | |
|---|---|---|---|
| 4,594,003 | A | 6/1986 | Sommargren |
| 4,639,139 | A | 1/1987 | Wyant et al. |
| 5,343,404 | A | 8/1994 | Girgis |
| 5,398,113 | A | 3/1995 | de Groot |
| 5,450,205 | A | 9/1995 | Sawin et al. |
| 5,473,434 | A | 12/1995 | de Groot |
| 6,181,420 | B1 | 1/2001 | Badami et al. |
| 6,359,692 | B1 | 3/2002 | de Groot |
| 6,690,218 | B2 | 2/2004 | Goldblatt |
| 6,924,898 | B2 | 8/2005 | Deck |
| 7,564,568 | B2 | 7/2009 | de Groot et al. |
| 2006/0023225 | A1 | 2/2006 | Tobben et al. |
| 2007/0200943 | A1 | 8/2007 | de Groot et al. |
| 2007/0206201 | A1 | 9/2007 | de Groot |
| 2008/0180679 | A1 | 7/2008 | de Groot |
| 2008/0266571 | A1 | 10/2008 | Deck |
| 2008/0285041 | A1 | 11/2008 | Ocelic et al. |

OTHER PUBLICATIONS

Hibino, Kenichi et al., "Suppression of Multiple-Beam Interference Noise in Testing an Optical-Parallel Plate by Wavelength-Scanning Interferometry", Optical Review, vol. 9, No. 2, pp. 60-65 (2002).
Ishii, Yukihiro et al., "Phase-Shifting Fizeau Interference Microscope with a Wavelength-Shifted Laser Diode", Opt. Eng., vol. 42, No. 1, pp. 60-67 (Jan. 2003).
International Search Report and Written Opinion dated Sep. 29, 2010, corresponding to Int'l. Appln. No. PCT/US2010026921.
Bönsch, G. and Bohme, H., "Phase determination of Fizeau interferences by phase shifting interferometry," Optik 82 161-164 (1989).
Creath, K., "Choosing a phase measurement algorithm for measurement of coated LIGO optics," Proc. SPIE 4101, pp. 47-56 (2000).
deGroot, "Optical Metrology" Encyclopedia of Optics, vol. 3, pp. 2100-2101 Wiley-VCH Publishers (2004).
de Groot and Deck, L.L., "New algorithms and error analysis for sinusoidal phase shifting interferometry," SPIE 7063 (2008).

(Continued)

*Primary Examiner* — Hwa S. A Lee
(74) *Attorney, Agent, or Firm* — Fish & Richardson P.C.

(57) ABSTRACT

In certain aspects, disclosed methods include combining reference light reflected from a reference surface with test light reflected from a test surface to form combined light, the test and reference light being derived from a common source, sinusoidally varying a phase between the test light and reference light, where the sinusoidal phase variation has an amplitude u, recording at least one interference signal related to changes in an intensity of the combined light in response to the sinusoidal variation of the phase, determining information related to the phase using a phase shifting algorithm that has a sensitivity that varies as a function of the sinusoidal phase shift amplitude, where the sensitivity of the algorithm at 2 u is 10% or less of the sensitivity of the algorithm at u.

37 Claims, 7 Drawing Sheets

OTHER PUBLICATIONS de Groot, P., "Measurement of transparent plates using wavelength-tuned phase shifting interferometry," Appl. Opt. 39(16), pp. 2658-2663 (2000).

de Groot, P., "Phase-shift calibration errors in interferometers with spherical Fizeau cavities", Applied Optics, vol. 34, No. 16 (Jun. 1995).

de Groot, P., "Long-wavelength laser diode interferometer for surface flatness measurement", Proc. SPIE 2248, Optical measurements and sensors for the process industries, pp. 136-140 (1994).

de Groot, P., "20-frame sinusoidal phase shifting Summary of data acquisition, processing & calibration", Zygo (Oct. 2008).

de Groot, Peter, "Design of error-compensating algorithms for sinusoidal phase shifting interferometry", Applied Optics, vol. 48, No. 35, pp. 6788-6796 (Dec. 2009).

P. de Groot, "Vibration in phase shifting interferometry," J. Opt. Soc. Am. A., 12(2), pp. 354-365 (1995).

Dorrio, B.V. Blanco-Garci'a, C., et al., "Phase error calculation in a Fizeau interferometer by Fourier expansion of the intensity profile," Appl. Opt. 35(1), pp. 61-64 (1996).

Dubois, "Phase-map measurements by interferometry with sinusoidal phase modulation and four integrating buckets ," J. Opt. Soc. Am. A 18, 1972-1979 (2001).

Falaggis, Konstantinos et al., "Phase measurement through sinusoidal excitation with application to multi-wavelength interferometry", Journal of Optics A: Pure Appl. Opt 11, pp. 1-11 (2009).

Freischlad, K., Koliopoulos, C.L. et al., "Fourier description of digital phase-measuring interferometry," J. Opt. Soc. Am. A 7(4), pp. 542-551 (1990).

Gardner, D., "Characterizing Digital Cameras with the Photon Transfer Curve," Summit imaging (undated document supplied by Jake Beverage).

Gradshteyn, I.S. and Ryzhik, I.M., "Table of integrals, series and products," 973, Academic Press (1980).

P. Hariharan "Digital phase-stepping interferometry: effects of multiply reflected beams," Appl. Opt. 26(13) 2506-2507 (1987).

P. Hariharan, "Phase-stepping interferometry with laser diodes: effect of changes in laser power with output wavelength" Appl. Opt. 28, pp. 27-28 (1989).

Hibino, K., Oreb, B.F., et al., "Phase shifting for nonsinusoidal waveforms with phase-shift errors," JOSA A, 12, (4), pp. 761-768 (1995).

Ishii, Y., Chen, and Murata, K., "Digital phase-measuring interferometry with a tunable laser diode," Opt. Lett. 12, pp. 233-235 (1987).

Malacara, D., Servin, M. et al., Interferogram Analysis for Optical Testing, p. 174 (New York: Marcel Dekker, 1998).

Malacara, D., Servin, M. et al., Interferogram Analysis for Optical Testing, pp. 216-275 (New York: Marcel Dekker, 1998).

R.C. Moore and F.H. Slaymaker, "Direct measurement of phase in a spherical-wave Fizeau interferometer," Appl. Opt. 19 (13), pp. 2196-2200 (1980).

Onodera, R. and Ishii, Y., "Phase-extraction analysis of laser-diode phase-shifting interferometry that is insensitive to changes in laser power", J. Opt. Soc. Am. A 13, p. 139 (1996).

Sasaki, H. Okazaki, and M. Sakai, "Sinusoidal phase modulating interferometer using the integrating-bucket method," Appl. Opt. 26, 1089 (1987).

Sasaki and H. Okazaki, "Analysis of measurement accuracy in sinusoidal phase modulating interferometry," Appl. Opt. vol. 25, No. 18, 3152 (1986).

Sasaki, T. Okamura, and T. Nakamura, "Sinusoidal phase modulating Fizeau interferometer," Appl. Opt. 29, 512 (1990).

Sasaki, O. and Takahashi, K., "Sinusoidal phase modulating interferometer using optical fibers for displacement measurement," Appl. Opt. 27, 4139 (1988).

Sasaki, O., Kuwahara, R. et al., "Sinusoidal wavelength-scanning interferometric reflectometry," Proc. SPIE 3740, pp. 618-621 (1999).

Sasaki, O., Nakada, T., et al., "Exact measurements of surface profiles of a glass plate by a superluminescent diode interferometer," Opt. Eng. 38(10), pp. 1679-1682 (1999).

Schwider, J. et al., "Digital wave-front measuring interferometry: some systematic error sources," Appl. Opt., vol. 22, No. 21 pp. 3421-3432 (Nov. 1983).

Surrel, Y., "Additive noise effect in digital phase detection," Appl. Opt. 36(1), pp. 271-276 (1997).

van Wingerden, J. et al., "Linear approximation for measurement errors in phase shifting interferometry," Appl. Opt. 30(19), pp. 2718-2729 (1991).

Wang, X. et al., "All-fiber sinusoidal phase-modulating laser diode interferometer insensitive to the intensity change of the light source," Proc. SPIE 4601, pp. 109-114 (2001).

Wyant, J.C. et al., "An optical profilometer for surface characterization of magnetic media," ASLE Trans. 27, p. 101 (1984).

Wyant, J.C., "Use of an ac Heterodyne Lateral Shear Interferometer with Real-Time Wavefront Correction Systems," Appl. Opt. 14, p. 2622 (1975).

Zhang, C., and Wang, X., "Sinusoidal phase-modulating laser diode interferometer for measuring angular displacement," Opt. Eng. 43(12), pp. 3008-3013 (2004).

ERROR COMPENSATION IN PHASE SHIFTING INTERFEROMETRY

TECHNICAL FIELD

This disclosure relates to phase-shifting interferometry, and, in particular, to phase shifting interferometry using Fizeau-cavities.

BACKGROUND

Interferometric optical techniques are widely used to measure optical thickness, flatness, and other geometric and refractive index properties of precision optical components such as glass substrates used in lithographic photomasks.

For example, one can use an interferometer to combine a test wavefront reflected from a test surface with a reference wavefront reflected from a reference surface to form an optical interference pattern. Spatial variations in the intensity profile of the optical interference pattern correspond to phase differences between the combined test and reference wavefronts caused by, for example, variations in the profile of the test surface relative to the reference surface.

Phase-shifting interferometry (PSI) can be used to accurately determine the phase differences and the corresponding profile of the measurement surface based on a series of optical interference patterns recorded for each of multiple phase-shifts between the test and reference wavefronts. For each spatial location of the pattern, the series of optical interference patterns define a series of intensity values, herein also referred to as interference signal, which depend on the phase difference between the combined test and reference wavefronts for that spatial location. Using numerical techniques known in the art, the phase difference can be extracted from the interference signal for each spatial location. These phase differences can be used to determine information about the test surface including, for example, a profile of the measurement surface relative the reference surface. Such numerical techniques are referred to as phase-shifting algorithms.

In PSI, one distinguishes between linearly varying and sinusoidally varying the relative phase shift between the test wavefront and the reference wavefront.

In sinusoidal PSI, a time dependent phase shift, which varies sinusoidally in time, is introduced between the test light and the measurement light. For each spatial location of the pattern, the interference signal made up of a series of intensity values has a complicated, non-sinusoidal dependence on the phase-shifts. Specifically designed sinusoidal phase-shifting algorithms extract the phase difference for each spatial location from this complicated dependence of the intensity values.

Sinusoidal PSI is described, for example, in commonly owned U.S. Patent Application published as US-2008/0180679-A1 to P. J. De Groot entitled "SINUSOIDAL PHASE SHIFTING INTERFEROMETRY," the contents of which are herein incorporated by reference. The error compensation and algorithm design procedures disclosed in U.S. Patent Application 2008/0180679 cover random noise, additive noise, multiplicative noise, laser diode intensity modulation, detector nonlinearity, vibrations, calibration error, timing error, phase shift nonlinearity, and sensitivity to frame integration time.

In linear PSI, a time dependent phase shift, which varies linearly in time, is introduced between the test and reference wavefronts. The series of optical interference patterns usually spans a full cycle of optical interference (e.g., from constructive, to destructive, and back to constructive interference). In linear PSI, the interference signal has a sinusoidal dependence on the phase-shifts with a phase difference equal to the phase difference between the combined test and reference wavefronts for that spatial location. Specifically designed linear phase-shifting algorithms extract the phase difference for each spatial location from the sinusoidal dependence of the intensity values.

The varying phase-shifts in sinusoidal and linear PSI can, for example, be produced by various ways that change the optical path length from the test surface to the interferometer relative to the optical path length from the reference surface to the interferometer. For example, the reference surface can be moved (e.g., sinusoidal or linear) relative to the test surface or a modulator may be placed in one of the beam paths. Alternatively, the phase-shifts can be introduced for a constant, non-zero optical path difference by changing the wavelength of the test and reference wavefronts. The latter application is known as wavelength tuning PSI and is described, e.g., in U.S. Pat. No. 4,594,003 to G. E. Sommargren. The ability of certain types of modulating means (e.g., piezoelectric transducers, wavelength tunable lasers, etc) to produce a linear phase shift may be limited, due to, for example, bandwidth limitations.

The interference pattern in a PSI system is typically detected by a conventional camera system, converted to electronic data, and read out to a computer for analysis. In such applications, the optical interference pattern is imaged onto an array of pixels. Charge accumulates at each pixel at a rate that depends on the intensity of the incident light. The charge value at each pixel is then read out, or transferred to a data processing unit. The charge values for a series of phase-shifts form the interference signal of that specific pixel.

SUMMARY

Sinusoidal PSI can beneficially relax requirements on the phase-shifting mechanism in an interferometer and can be easier to implement compared to linear PSI. Sinusoidal PSI can also facilitate improvements in interferometer design based on high-speed, continuous data averaging, which is beneficial for increased performance in the presence of electronic, optical and environmental noise.

However, sinusoidal PSI can be subject to various signal distortions. In Fizeau interferometers, for example, sinusoidal PSI can be subject to multiple reflections within the Fizeau cavity. Such signal distortions result from the coherent superposition of light being reflected multiple times between the reference surface and the test surface and can cause errors when determining the phase difference between the reference light and the test light.

The effect of these errors can be mitigated by using certain PSI algorithms as sensitivity filters such that data processing of an interference signal is performed with a reduced sensitivity for contributions of multiple internal reflections. For example, PSI algorithms can be design for interferometer geometries for which there are multiple or spurious reflections in addition to the expected reflections from the object and reference surfaces, resulting in a distorted interference signal. PSI algorithms having none or a reduced sensitivity for signal contributions from multiple or spurious reflections can then be used to analyze the distorted interference signal. Specifically, PSI algorithms can be designed as sensitivity filters with respect to errors from multiple reflections by enforcing a peak or near-peak sensitivity to interference signals generated by a specified sinusoidal phase modulation amplitude, while having zero or near-zero sensitivity to at least one integer multiple of this amplitude. In certain embodiments, the at least one integer multiple is equal to two times the sinusoidal phase modulation amplitude, corresponding to two round-trip passes through the Fizeau cavity, which is the strongest spurious reflection for this geometry.

For example, assuming that the maximum sensitivity (i.e. 100%) is at or close to a phase modulation amplitude u, then the sensitivity at N u (N being an integer, e.g., 2, 3, 4, ... ) is zero or near-zero, for example, 10% or less, 7% or less, 5% or less, 4% or less, 3% or less, 2% or less, 1% or less. An example for a definition of a sensitivity of PSI algorithms to intensity noise at a particular sinusoidal phase shift amplitude can be based on a standard deviation expectation over all phase angles.

Such PSI algorithms can be applied in interferometer systems having multiple image points, as in an imaging interferometer for surface profiling, as well as in single channel interferometers, such as in a single-beam displacement gage.

As a further improvement for sinusoidal PSI, data can be acquired and averaged using a varying phase offset. Then, residual errors that are periodic with phase are averaged to further reduce errors of all kinds, including those related to multiple round-trip reflections within the Fizeau cavity.

In general, in one aspect, the invention features methods that include combining reference light reflected from a reference surface with test light reflected from a test surface to form combined light, the test and reference light being derived from a common source, sinusoidally varying a phase between the test light and reference light, where the sinusoidal phase variation has an amplitude u, recording at least one interference signal related to changes in an intensity of the combined light in response to the sinusoidal variation of the phase, determining information related to the phase using a phase shifting algorithm that has a sensitivity that varies as a function of the sinusoidal phase shift amplitude, where the sensitivity of the algorithm at 2 u is 10% or less of the sensitivity of the algorithm at u.

Embodiments of the methods can include one or more of the following features and/or features of other aspects.

In some embodiments, the sensitivity can characterizes how the phase shifting algorithm responds to the interference signal as a function of the amplitude u.

In some embodiments, the sensitivity of the algorithm at 2 u can be, for example, 5% or less, 2% or less, and/or 1% or less of the sensitivity of the algorithm at u.

In some embodiments, the sensitivity of the algorithm at N u can be 10% or less, 5% or less, 2% or less, or 1% or less of the sensitivity of the algorithm at u, where N is an integer greater than 2 (e.g., 3, 4, 5, 6, or greater).

In some embodiments, the sensitivity of the algorithm can have a minimum close to 2 u and in a range from 2 u±0.2 u, the sensitivity can be 10% or less of the sensitivity of the algorithm at u. In some embodiments, the range can be 2 u±0.1 u, 2 u±0.05 u, 2 u±0.1 u and the sensitivity can be 5% or less, 2% or less, or 1% or less of the sensitivity of the algorithm at u.

In some embodiments, the phase shifting algorithm can have a sensitivity to contributions to the combined light from test light that makes a double pass between the test and reference surfaces that is 10% or less, 5% or less, 2% or less, or 1% or less of the sensitivity of the algorithm to contributions to the combined light from test light that makes a single pass between the test and reference surfaces.

In some embodiments, the phase shifting algorithm can be a function of a plurality of values of the interference signal and coefficients $h_{odd}$ and $h_{even}$, where $h_{odd}$ and $h_{even}$ are sensitive to the odd and even harmonics of the sinusoidal phase variation frequency. In some embodiments, the phase shifting algorithm can be a function of a ratio of the coefficients $h_{odd}$ to the coefficients $h_{even}$.

In some embodiments, the phase shifting algorithm can determine a phase value, θ, of the interference signal according to the equation $$\tan(\theta) = \frac{\sum_j (h_{odd})_j I_j}{\sum_j (h_{even})_j I_j},$$

where j=0, 1, ..., P−1 and $I_j$ are intensity samples of the combined light composing the interference signal acquired during P corresponding phase shifts.

In certain embodiments, the coefficients $h_{odd}$ and $h_{even}$ can be selected subject to the constraints $$\sum_j (h_{odd})_j (h_{even})_j = 0,$$

$$\sum_j (h_{odd})_j \cos[v(\alpha_j + \varphi)] = 0 \quad \text{for } v = 2, 4, 6 \ldots$$

and $$\sum_j (h_{even})_j \cos[v(\alpha_j + \varphi)] = 0 \quad \text{for } v = 1, 3, 5 \ldots .$$

wherein the sinusoidal phase variation is of the form $$\phi_j = u \cos(\alpha_j),$$

where $\alpha_j = j\Delta\alpha + \Delta + /2$ and $\Delta\alpha = 2\pi/P$.

In some embodiments, the sensitivity of the phase shifting algorithm can be determined based on the coefficients $h_{odd}$ and $h_{even}$. In certain embodiments, the sensitivity of the phase shifting algorithm can be determined based on a filter function for the odd harmonics, $F_{odd}(u)$, and a filter function for the even harmonics, $F_{even}(u)$. For example, the sensitivity can be expressed as a sensitivity function, sens(u), which is given by $$sens(u) = \frac{\sqrt{F_{odd}(u)^2 + F_{even}(u)^2}}{2\Gamma},$$

where Γ is a constant. The filter function $F_{odd}(u)$ can be a function of odd-ordered Bessel functions and the filter function $F_{even}(u)$ can be a function of even-ordered Bessel functions.

In some embodiments, u can be greater than π/2 radians.

In some embodiments, the recording can include recording a plurality of interference signals, each corresponding to a different location of the test surface. In some embodiments, the recording can include detecting an interference pattern formed by the combined light using a multi-element detector.

In some embodiments, the test and reference light can be combined using a Fizeau interferometer.

In some embodiments, the recording can include the phase can be sinusoidally varied by varying an optical path length difference between the test and reference surfaces.

In some embodiments, the phase can be sinusoidally varied by varying a wavelength of the test and reference light.

In some embodiments, the information can include a phase of the interference signal and/or a profile of the test surface.

In some embodiments, the methods can further include modifying the test surface based on the information. Modifying the test surface can include modifying a shape of the test surface.

The test surface can be a surface of an optical element. The optical element can include a lens, a mirror, or an optical flat.

In general, in a further aspect, the invention features methods that include combining reference light reflected from a reference surface with test light reflected from a test surface to form combined light, the test and reference light being derived from a common source, sinusoidally varying a phase between the test light and reference light, recording at least one interference signal based on a modulation of the combined light in response to varying the phase, determining information related to the phase using a phase shifting algorithm that has a sensitivity to contributions to the combined light from test light that makes a double pass between the test and reference surfaces that is 10% or less of the sensitivity of the algorithm to contributions to the combined light from test light that makes a single pass between the test and reference surfaces.

Embodiments of the methods can include one or more of the features of other aspects.

In general, in a further aspect, the invention features systems that include an interferometer which during operation combines test light from a test surface with reference light from a reference surface to form combined light, where the test and reference light are derived from a common source, a phase shifting component which during operation introduces a sinusoidal phase shift between the test light and reference light, where the sinusoidal phase variation has an amplitude u, a detector positioned to detect the combined light and provide at least one interference signal based on the modulation of the combined light beam in response to varying the phase, and an electronic controller coupled to the phase shifting component and the detector, wherein the electronic controller is configured to determine information related to the phase during operation of the system, where the electronic controller determined the information using a phase shifting algorithm that has a sensitivity that varies as a function of the sinusoidal phase shift amplitude, where the sensitivity of the algorithm at 2 u is 10% or less of the sensitivity of the algorithm at u.

Embodiments of the systems can include one or more of the following features and/or features of other aspects.

In some embodiments, the interferometer can be a Fizeau interferometer.

In some embodiments, the phase shifting component can be the common source, the common source being a wavelength tunable light source.

In some embodiments, the phase shifting component can be a transducer coupled to the test surface or the reference surface.

In general, in a further aspect, the invention features methods that include combining reference light reflected from a reference surface with test light reflected from a test surface to form combined light, the test and reference light being derived from a common source, sinusoidally varying a phase between the test light and reference light, recording at least one interference signal related to changes in an intensity of the combined light in response to the sinusoidal variation of the phase, determining information related to the phase by analyzing the at least one interference signal using a phase shifting algorithm, wherein the phase shifting algorithm is configured to determine a phase value, $\theta$, of the interference signal based on twenty intensity samples $I_j$ of the combined light composing the interference signal according to the equation $$\tan(\theta) = \frac{\sum_j (h_{odd})_j I_j}{\sum_j (h_{even})_j I_j},$$

where j=0, 1, . . . , 19 and coefficients $h_{odd}$ and $h_{even}$ are given by $$h_{odd} = \begin{pmatrix} 0.07014 & -0.02966 & -0.01048 & -0.13572 & -0.14926 \ldots \\ 0.14926 & 0.13572 & 0.01048 & 0.02966 & -0.07014 \ldots \\ -0.07014 & 0.02966 & 0.01048 & 0.13572 & 0.14926 \ldots \\ -0.14926 & -0.13572 & -0.01048 & -0.02966 & 0.07014 \end{pmatrix}$$

and $$h_{even} = \begin{pmatrix} 0.06611 & -0.14129 & -0.01346 & -0.08822 & 0.1768 \ldots \\ -0.17686 & 0.08822 & 0.01346 & 0.14129 & -0.06611 \ldots \\ -0.06611 & 0.14129 & 0.01346 & 0.08822 & -0.17686 \ldots \\ 0.17686 & -0.08822 & -0.01346 & -0.14129 & 0.06611 \end{pmatrix}$$

Embodiments of the methods can include one or more of the following features and/or features of other aspects.

In some embodiments, the sinusoidal phase variation can have an amplitude u of about 4.18.

In some embodiments, the intensity samples $I_j$ can be acquired for phase shifts $\Delta\alpha=\pi/10$.

In general, in a further aspect, the invention features methods that include combining reference light reflected from a reference surface with test light reflected from a test surface to form combined light, the test and reference light being derived from a common source, sinusoidally varying a phase between the test light and reference light, recording at least one interference signal related to changes in an intensity of the combined light in response to the sinusoidal variation of the phase, determining information related to the phase by analyzing the at least one interference signal using a phase shifting algorithm, wherein the phase shifting algorithm is configured to determine a phase value, $\theta$, of the interference signal based on twenty intensity samples $I_j$ of the combined light composing the interference signal according to the equation $$\tan(\theta) = \frac{\sum_j (h_{odd})_j I_j}{\sum_j (h_{even})_j I_j},$$

where j=0, 1, . . . , 11 and coefficients $h_{odd}$ and $h_{even}$ are given by $$h_{odd} = \begin{pmatrix} 1.2461 & -1.5525 & -2.5746 & 2.5746 & 1.5525 & -1.2461 \ldots \\ -1.2461 & -1.5525 & 2.5746 & -2.5746 & -1.5525 & 1.2461 \end{pmatrix}$$

and $$h_{even} = \begin{pmatrix} 0.2707 & -2.6459 & 2.3753 & -2.3753 & 2.6459 & -0.2707 \ldots \\ -0.2707 & 2.6459 & -2.3753 & 2.3753 & -2.6459 & 0.2707 \end{pmatrix}.$$

Embodiments of the methods can include one or more of the following features and/or features of other aspects.

In some embodiments, the sinusoidal phase variation can have an amplitude u of about 3.384. In some embodiments, the intensity samples $I_j$ can be acquired for phase shifts $\Delta\alpha=\pi/6$.

In general, in a further aspect, the invention features methods that include combining reference light reflected from a reference surface with test light reflected from a test surface to form combined light, the test and reference light being derived from a common source, sinusoidally varying a phase between the test light and reference light, where the sinusoidal phase variation has an amplitude u and a phase-offset, recording an interference signal, while varying the phase-offset in a predetermined way, and determining information related to the phase by analyzing the interference signal using a phase shifting algorithm.

Embodiments of the methods can include one or more of the following features and/or features of other aspects.

In some embodiments, the interference signal can include a sequence of intensity values and the phase shifting algorithm is configured to derive a phase from a subset of intensity values.

The subset of intensity values can correspond to an oscillation of the sinusoidal variation of the phase.

In some embodiments, analyzing the interference signal can include deriving a phase for at least two subsets for different phase-offsets and determining information related to the phase includes averaging the phases of the at least two subsets.

In certain embodiments, analyzing the interference signal can include averaging intensity values of the interference signal and determining information deriving a phase from the averaged intensity values.

The interference signal can include a sequence of N recorded subsets and the phase-offset varies between two subsets over a phase of $4\pi/N$.

The phase shifting algorithm can have a sensitivity that varies as a function of the sinusoidal phase shift amplitude, where the sensitivity of the algorithm at 2 u is 10% or less of the sensitivity of the algorithm at u.

The phase-offset can vary at a frequency that is lower than the frequency of the sinusoidal variation of the phase. The phase-offset can vary at least one of continuously, stepwise, or randomly. The phase-offset can vary according to a triangular function. The phase-offset can vary over a phase range of $2\pi$. The phase-offset can be varied according to a non-constant function f(t).

In general, in a further aspect, the invention features methods that include combining reference light reflected from a reference surface with test light reflected from a test surface to form combined light, the test and reference light being derived from a common source, sinusoidally varying a phase between the test light and reference light, where the sinusoidal phase variation has an amplitude u, recording at least one interference signal related to changes in an intensity of the combined light in response to the sinusoidal variation of the phase, determining information related to the phase using a phase shifting algorithm that has a sensitivity that varies as a function of the sinusoidal phase shift amplitude, wherein the sensitivity of the algorithm has a minimum close to 2 u and in a range from 2 u±0.2 u, the sensitivity is 10% or less of the sensitivity of the algorithm at u to suppress calibration errors in u.

Embodiments of the methods can include one or more of the features of other aspects.

As used herein, "light" and "optical" does not only refer to visible electromagnetic radiation; rather such terms include electromagnetic radiation in any of the ultraviolet, visible, near-infrared, and infrared spectral regions.

Unless otherwise defined, all technical and scientific terms used herein have the same meaning as commonly understood by one of ordinary skill in the art to which this invention belongs. In case of conflict with any document incorporated by reference, the present disclosure controls.

The details of one or more embodiments are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

Figure 1:
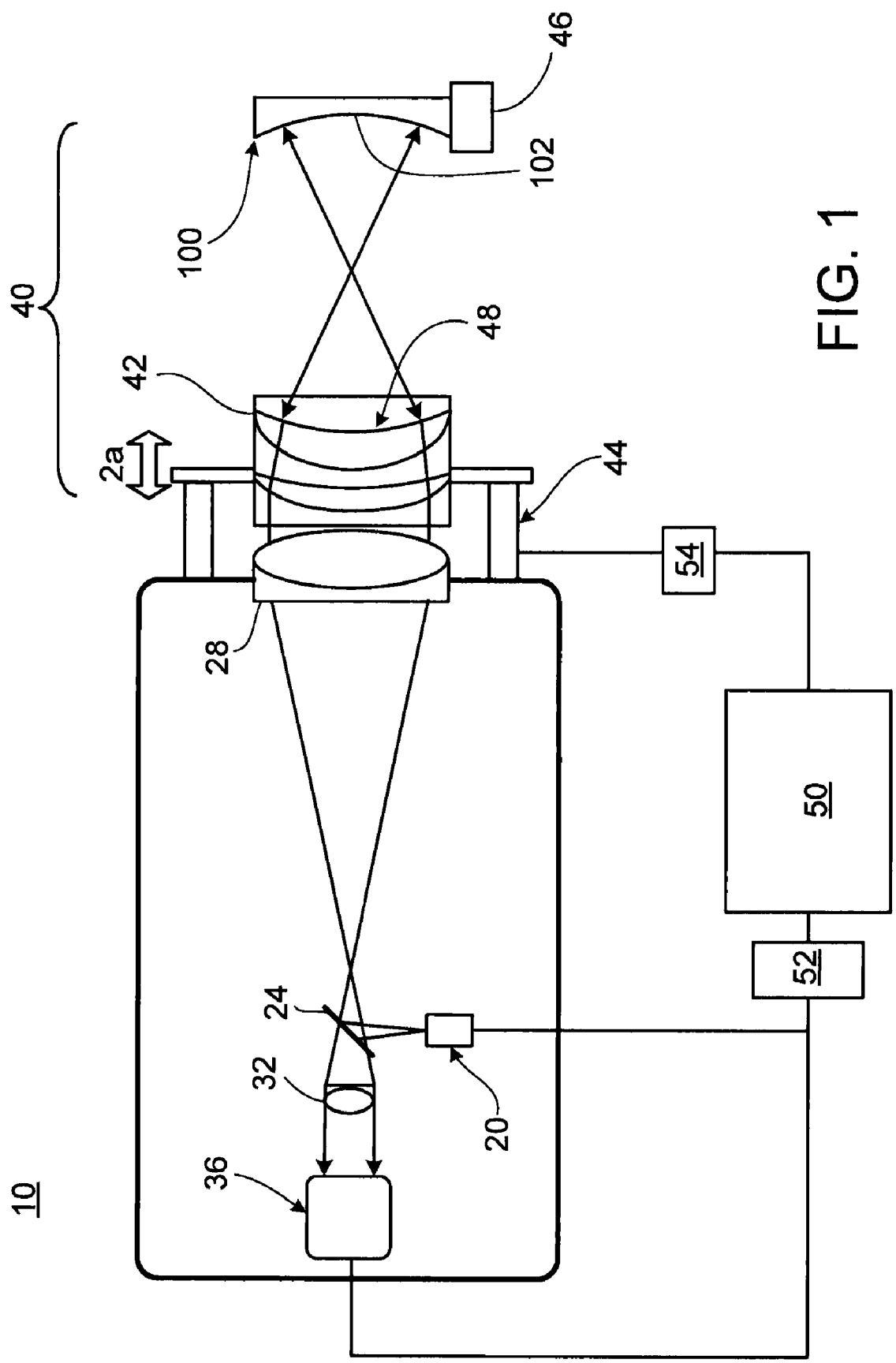
FIG. 1 is a schematic diagram of an embodiment of a sinusoidal phase-shifting interferometer system featuring mechanical phase shifting.

In FIG. 1, a schematic diagram of a phase-shifting interferometric system 10 is shown. Phase-shifting interferometric system 10 is adapted to measure the profile of a test surface 102 of a measurement object 100. Phase-shifting interferometric system 10 includes a light source 20 (e.g., a laser), a beam splitter 24, a collimating optic 28 for collimating light emitted from the light source, a Fizeau cavity 40 (e.g., a spherical cavity), a charge coupled device (CCD) camera 36, and an imaging optic 32 for imaging light exiting Fizeau cavity 40 onto camera 36. Phase-shifting interferometric system 10 includes further a controller 50 (e.g., a computer) and a frame grabber 52 for reading images detected by CCD camera 36.

Spherical-cavity Fizeau cavity 40 includes reference optics 42 mounted on a translatable stage 44. Translatable stage 44 is in communication with controller 50 through a driver 54.

Spherical-cavity Fizeau cavity 40 includes further a mount 46 for positioning measurement object 100 and accordingly adjusting Fizeau cavity 40.

The back surface of reference optics 42 defines a reflective reference surface 48 for the interferometer that together with test surface 102 forms an optical cavity. Other surfaces of reference optics 42 have, for example, an antireflection coating and may be additionally or alternatively tilted with respect to reference surface 48, so that contributions of reflections from these surfaces in any subsequent measurements are reduced or eliminated.

During operation of the interferometric system 10, light source 20 directs light at a wavelength λ to beam splitter 24, which then directs the light to collimating lens 28 to collimate the light before entering the reference optics 42. Reference surface 48 reflects a first portion of the light to form reference light, and test surface 102 of test object 100 reflects an additional portion of the light to form test light. Lenses 28 and 32 then direct the reference and test light onto CCD camera 36 where they form an optical interference pattern.

Controller 50 causes driver 54 to move translatable stage 44 to dither reference optics 42 back and forth, thereby acting as a mechanical phase-shifter that changes the optical path difference (OPD) between light reflected from test surface 102 and light reflected from reference surface 48 of reference optics 42. The change of the OPD affects the optical interference pattern. For sinusoidal PSI, controller 50 causes a sinusoidal displacement of reference optics 42 as a function of time, thereby producing a sinusoidal phase shift, while for linear PSI, controller 50 causes a linear displacement of reference optics 42.

CCD camera 36 detects the optical interference pattern as a function of time while the position of the reference surface 48 is varied and, on a pixel basis, generates intensity values for controller 50. For the data acquisition, controller 50 causes frame grabber 52 to store an image frame of the optical interference pattern detected by CCD camera 36 at multiple acquisition times during the sinusoidal phase shifting. The rate at which image frames are acquired is known as the frame rate.

Frame grabber 52 sends the recorded images of the interference pattern to controller 50 that, on a pixel basis, forms an interference signal from the recorded intensity values. As explained below, the analysis of the interference signals is then performed with a PSI algorithm that is configured to suppress contributions from Fizeau errors to the interference signal.

Specifically, controller 50 analyzes the interference signals to determine the phase variation profile θ(x, y) that corresponds to the OPD between reference surface 48 and test surface 102, such that:

$$\theta(x, y) = 4\pi n L(x, y)\frac{1}{\lambda} + \Phi, \quad (1)$$

where the surfaces are separated by a physical gap L, n is the refractive index of material in the gap, and φ is an overall constant phase. The x and y dependence of gap L and phase variation profile θ are shown explicitly in Eq. 1 to indicate the spatial variation in OPD, which is captured by the pixels of CCD camera 36. In some embodiments, refractive index n may also have an x and y dependence. For example, an optical component or system may be arranged between reference surface 48 and test surface 102 that includes a transparent material having a variable refractive index over the field of view as an accidental or intentional consequence of how the material is made.

Extraction of this phase variation profile θ(x, y), also referred to as phase map, is the information that is typically of interest in an imaging interferometer for surface profiling. For example, assuming that the surface profile of the reference surface 48 is well-characterized, the surface profile of the test surface can be extracted from phase variation profile θ(x, y). In contrast in some applications (e.g., in a single beam displacement gage), a single interference signal (or a small number of interference signals) is analyzed.

Referring again to FIG. 1, the Fizeau-cavity formed by test surface 102 and reference surface 48 engenders several potential error sources, including a distortion of the expected interference fringes because of multiple reflections back and forth between test surface 102 and reference surface 48. Multiple reflections are illustrated schematically in FIG. 2A.

Figure 2A:
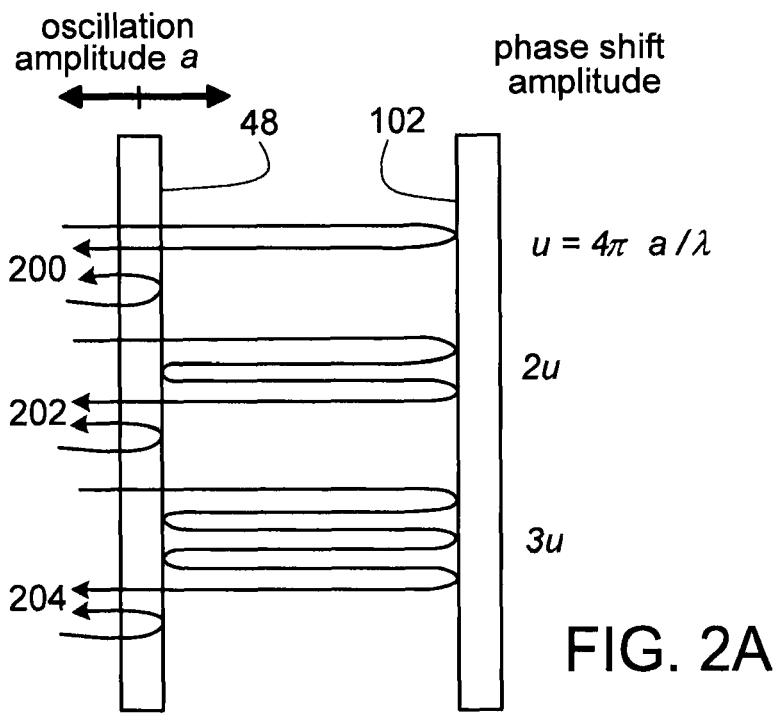
FIG. 2A is a schematic diagram of an embodiment of a planar Fizeau cavity illustrating multiple reflections within the cavity.

As illustrated in FIG. 2A for a planar Fizeau cavity formed by reference surface 48 and test surface 102, one can identify a single-pass interference contribution 200, resulting from a single reflection of the light from test surface 102 and a single reflection of the light from reference surface 48. However, the interference signal can also include a contribution that results from an interference between reference light and test light that after being reflected from test surface 102 is reflected from reference surface 38 back to test surface 102, where there is a second reflection from the test surface 102. Such a double-pass through the Fizeau cavity causes a double-pass interference contribution 202 as a second order contribution. As another example of a higher order contribution, FIG. 2A shows further a triple-pass interference contribution 204.

Figure 2B:
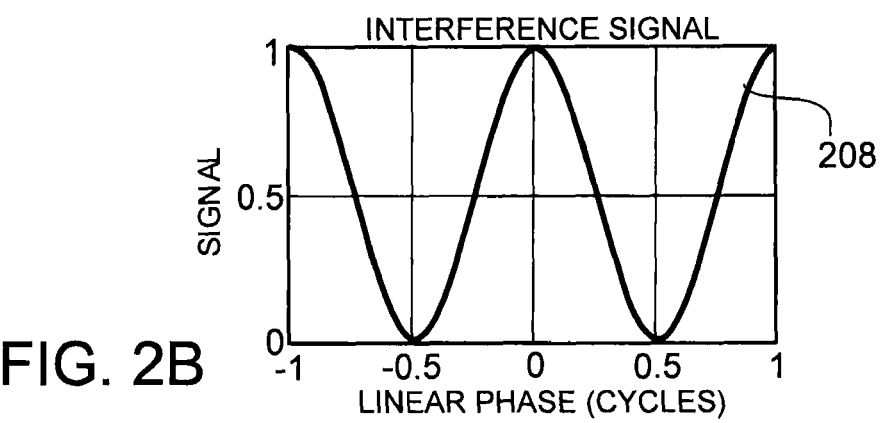
FIG. 2B is a graph showing an example of an interference signal for two-beam interference for a linear phase shift.
Figure 2C:
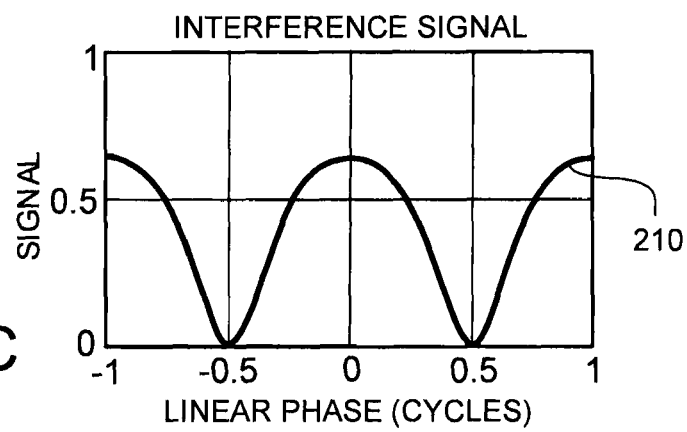
FIG. 2C is a graph showing an example of an interference signal with contributions from multiple reflections for a Fizeau cavity and a linear phase shift.

The second-, third- and higher order contributions add to the single-pass interference, resulting in a fringe distortion of the detected interference signal with respect to a assumed single-pass interference signal. For simplicity, FIGS. 2B and 2C illustrate the effect of higher order distortions onto an interference signal for a linear scan. Specifically, FIG. 2B illustrates an interference signal 208 simulated for a linear phase shift in a two-beam interferometer such as a laser Fizeau interferometer in the limiting case of vanishing reflectivities of the test surface and reference surface such that multiple passes through the Fizeau cavity are negligible (single-pass Fizeau interference). An interference signal as shown in FIG. 2B can also be measured using low-coherence microscopes of, e.g., a Michelson type or Twyman Green type.

In the plot of FIG. 2C, a distorted interference signal 210 is shown simulated for a laser Fizeau cavity with a reflectivity of 25% for the reference and test surfaces. The interference pattern is distorted with respect to the simple cosine wave expected for single-pass Fizeau interference as shown in FIG. 2B.

For sinusoidal PSI, an interference signal is similarly distorted by higher order contributions. Such distortions can lead to errors when measuring the phase variation profile θ(x, y) of a test object.

In general, the distortion increases with the reflectivity of object and reference surfaces, adding additional spurious contributions to the interference signal for three, four and higher numbers of passes through the Fizeau cavity.

Referring again to FIG. 2A, the spurious interference effects attributable from multiple reflections in the Fizeau cavity are distinguishable from the desired single-pass interference contribution 200 by the involved amplitude of the imparted phase shift. A sinusoidal oscillation of reference optics 42 with an oscillation amplitude a yields for single-pass interference an oscillating phase shift with a phase shift amplitude u=4πα/λ. A double-pass interference, however, oscillates with a phase shift amplitude of 2 u, a triple-pass interference oscillates with a phase shift amplitude of 3 u, etc.

Thus, because it is the motion of the reference surface that generates the phase shift in the Fizeau interferometer, every reflection of the test light from the reference surface 48 results in an additional phase shift, in integer multiples of the expected phase shift from a single-pass interference effect. Therefore the spurious interference effects are characterized by signal contributions that result from integer multiples of two or more times the expected phase shift.

In some embodiments, methods for suppressing the contributions of multiple-reflection errors when analyzing a measurement with Fizeau interferometers employ a phase processing algorithm specifically designed to be insensitive to signal contributions corresponding to those signals generated by integer multiples of two or more times the expected phase shift. In certain embodiments, algorithm design relies on balancing at harmonics of the fundamental phase shift frequency to compensate for potential errors. The harmonics are chosen and the data processing designed specifically to balance the effects of multiple-reflection errors on multiple harmonics so as to substantially cancel them.

The foregoing aspects can be integrated into the design of PSI algorithm. In general, sinusoidal PSI algorithms are of the form $$\tan(\theta) = \frac{\Gamma_{even}}{\Gamma_{odd}} \frac{R_{odd}(\theta)}{R_{even}(\theta)} \quad (2)$$

where $\Gamma_{even}$, $\Gamma_{odd}$ are constant normalization factors $R_{odd}$, $R_{even}$ are given by $$R_{odd}(\theta) = \sum_j (h_{odd})_j I_j \quad (3)$$

$$R_{even}(\theta) = \sum_j (h_{even})_j I_j \quad (4)$$

where the $I_j$=0, 1, . . . P−1 are intensity samples that were acquired during a total number of P corresponding phase shifts $\phi_j$ $$\phi_j = u \cos(\alpha_j) \quad (5)$$

with $$\alpha_j = j\Delta\alpha + \Delta\alpha/2, \quad (6)$$

where typically (but not necessarily) $\Delta\alpha=2\pi/P$, and u is the sinusoidal phase shift amplitude. Herein, the x and y dependence of the phase variation profile θ(x, y) is suppressed for brevity but it should be understood that it can be reintroduced depending on the application.

Assuming two-beam interference based on a single-pass through the Fizeau cavity, the intensity values can be expressed as $$I_j = q + qV \cos(\theta + \phi_j) \quad (7)$$

The sinusoidal modulation of the phase φ generates an intensity signal Eq. (7) that is the sum of a series of harmonics of the fundamental phase modulation $\cos(\alpha_j)$ in Eq. (5). The relative phases of these frequency components are independent of the interference phase difference. Thus unlike linear phase shifting, the phase difference cannot be determined by a phase estimation of the interference signal. However, in sinusoidal PSI, the strengths of the frequency components at odd harmonics of the sinusoidal phase shift frequency are proportional to sin (θ) and the strengths of the frequency components at the even harmonics are proportional to cos (θ). Thus, comparing the relative strengths of even and odd frequency components provides quadrature values for the phase θ, from which we derive Eq. (2) for the phase θ. The algorithm coefficients $h_{odd}$ and $h_{even}$ in Eqs. (3) and (4) are constructed so as to be sensitive to these odd and even harmonics, respectively. From these observations and Eqs. (2), (3), (4), and (7), one can show that $$R_{odd}(\theta) = \sin(\theta)qV\Gamma_{odd} \quad (8)$$

$$R_{even}(\theta) = \cos(\theta)qV\Gamma_{even}. \quad (9)$$

The values for the constant normalization factors $\Gamma_{odd}$, $\Gamma_{even}$ follow from the sensitivity of $R_{odd}(\theta)$, $R_{even}(\theta)$ to intensity signals having purely odd or even harmonic content. The normalization constants $\Gamma_{odd}$, $\Gamma_{even}$ can be expressed as $$\Gamma_{odd} = 2 \sum_{v=1,3,5...}^{\infty} (-1)^{(v+1)/2} J_v(u_0)B(v)Q_{odd}(v) \quad (10)$$

$$\Gamma_{even} = 2 \sum_{v=2,4,6...}^{\infty} (-1)^{v/2} J_v(u_0)B(v)Q_{even}(v) \quad (11)$$

for $$Q_{odd}(v) = \sum_j (h_{odd})_j \cos(v\alpha_j) \quad (12)$$

$$Q_{even}(v) = \sum_j (h_{even})_j \cos(v\alpha_j), \quad (13)$$

where $J_v(u)$ is a Bessel function of order v, and $$B(v) = \frac{\sin(v\Delta\alpha/2)}{v\Delta\alpha/2}. \quad (14)$$

Here a synchronization offset has been set to zero and the sinusoidal phase shift amplitude u of the phase modulation has been set to a design value of $u_0$ of the corresponding algorithm.

The foregoing mathematical representation uses the mathematical representation as outlined in U.S. Patent Application US-2008/0180679-A1 as a basis. However, we note that some terms may be named differently. For example, the above introduced intensity samples $I_j$ are written as $\bar{g}_j$ in U.S. Patent Application US-2008/0180679-A1.

Within the foregoing derived mathematical representation, one can generalize the normalization constants $\Gamma_{odd}$, $\Gamma_{even}$ of Eqs. (10) and (11) as filter functions $F_{odd}(u)$, $F_{even}(u)$ that characterize the sensitivities of the numerator and denominator of the right-hand member of Eq. (2) to intensity signals generated by sinusoidal phase modulations of a phase shift amplitude u that may be different from the design value of $u_0$:

$$F_{odd}(u) = 2 \sum_{v=1,3,5...}^{\infty} (-1)^{(v+1)/2} J_v(u)B(v) \sum_j (h_{odd})_j \cos[v(\alpha_j)] \quad (15)$$

-continued $$F_{even}(u) = 2\sum_{v=2,4,6...}^{\infty}(-1)^{v/2}J_v(u)B(v)\sum_j (h_{even})_j \cos[v(\alpha_j)] \qquad (16)$$

Thus when $u=u_0$ $$\Gamma_{odd}=F_{odd}(u_0) \qquad (17)$$

$$\Gamma_{even}=F_{even}(u_0). \qquad (18)$$

The filter functions $F_{odd}(u)$, $F_{even}(u)$ can be used as the basis for determining the sensitivity of sinusoidal PSI algorithms to spurious sinusoidally-modulated signals such as can be generated in a Fizeau cavity. The filter functions $F_{odd}(u)$, $F_{even}(u)$ can also be used for determining the sensitivity to errors in setting the correct value of the sinusoidal modulation amplitude u.

The next step in the analysis of the sensitivity of a sinusoidal PSI algorithm to intensity errors is to define a noise $n_j(u'')$ of intensity amplitude q" at a sinusoidal modulation amplitude u" and a phase $\xi''$ $$n_j(u'', \xi'')=q'' \cos[\xi''+\phi''_j(u'')], \qquad (19)$$

where the sinusoidal phase shift of the noise term is $$\phi''_j(u'')=u'' \cos(\alpha_j). \qquad (20)$$

Note that this model is for noise that is synchronous (has the same phase increments $\alpha_j$) with the expected phase shift given in Eq. (5), but is of a different sinusoidal phase shift amplitude u" and phase $\xi''$. The double prime, e.g. for $\xi''$, is to emphasize that parameters of the additive noise term $n_j(u'', \xi'')$.

In the presence of the noise term $n_j(u'')$, the sinusoidal PSI algorithm will detect false signals $$N_{odd}(u'', \xi'') = \sum_j (h_{odd})_j n_j(u'', \xi'') \qquad (21)$$

$$N_{even}(u'', \xi'') = \sum_j (h_{even})_j n_j(u'', \xi'') \qquad (22)$$

that add directly to $R_{odd}(\theta)$, $R_{even}(\theta)$, respectively, in Eq. (2). The result is a phase error $\epsilon$:

$$\tan(\theta+\epsilon) = \frac{R_{odd}(\theta)+N_{odd}(u'', \xi'')}{R_{even}(\theta)+N_{even}(u'', \xi'')} \ldots \qquad (23)$$

Expanding Eq. (23) for small phase errors ($\epsilon \ll 1$) yields $$\tan(\theta) + [1+\tan^2(\theta)]\epsilon = \tan(\theta)\begin{bmatrix} 1+\dfrac{N_{odd}(u'', \xi'')}{R_{odd}(\theta)} - \\ \dfrac{N_{even}(u'', \xi'')}{R_{even}(\theta)} + \ldots \end{bmatrix}. \qquad (24)$$

Using $$\frac{\tan(\theta)}{1+\tan^2(\theta)} = \sin(\theta)\cos(\theta),$$

we have to first order a $\theta$-dependent error $$\epsilon(\theta) = \left[\frac{N_{odd}(u'', \xi'')}{R_{odd}(\theta)} - \frac{N_{even}(u'', \xi'')}{R_{even}(\theta)}\right]\sin(\theta)\cos(\theta). \qquad (25)$$

Recalling Eq. (8) and Eq. (9) for $R_{odd}(\theta)$, $R_{even}(\theta)$, respectively, the $\theta$-dependent error can be rewritten as $$\epsilon(\theta) = \frac{1}{qV}\left[\frac{N_{odd}(u'', \xi'')\cos(\theta)}{\Gamma_{odd}} - \frac{N_{even}(u'', \xi'')\sin(\theta)}{\Gamma_{even}}\right] \qquad (26)$$

where the filtered intensity noise functions $N_{odd}(u'',\xi)$, $N_{even}(u'',\xi)$ are given by Eqs. (21) and (22). We can relate the filtered intensity noise $N_{odd}(u'',\xi)$, $N_{even}(u'',\xi)$ to the filter functions $F_{odd}(u)$, $F_{even}(u)$ by expanding the noise as defined in Eq. (19):

$$n_j(u'',\xi'')=q'' \cos[\phi''_j(u'')]\cos(\xi'')-q'' \sin[\phi''_j(u'')]\sin(\xi''). \qquad (27)$$

Therefore $$N_{odd}(u'',\xi'')=-q''F_{odd}(u'')\sin(\xi'') \qquad (28)$$

$$N_{even}(u'',\xi'')=q''F_{even}(u'')\cos(\xi''). \qquad (29)$$

The phase error can therefore be expressed as $$\epsilon(\theta, u'', \xi'') = \frac{q''}{qV\Gamma}\begin{bmatrix} F_{odd}(u'')\sin(\xi'')\cos(\theta)+ \\ F_{even}(u'')\cos(\xi'')\sin(\theta) \end{bmatrix}, \qquad (30)$$

where the simplifying assumption is used that $$\Gamma_{odd}=\Gamma_{even}\equiv\Gamma. \qquad (31)$$

Eq. (30) is an example for a representation of a general $\theta$-dependent formula for phase measurement errors for additive intensity noise that is sinusoidally modulated synchronously with the main intensity signal (Eq. (7)).

The typical sensitivity sens (u) of an algorithm to intensity noise at a particular sinusoidal phase shift amplitude u may be defined as a standard deviation expectation over all phase angles $\theta$:

$$sens(u'')=\langle\epsilon^2\rangle_\theta-\langle\epsilon\rangle_\theta^2 \qquad (32)$$

where $$\langle\epsilon\rangle_\theta = \frac{1}{2\pi}\int_{-\pi}^{\pi}\epsilon(\theta, u'', \xi'')\,d\theta, \qquad (33)$$

$$\langle\epsilon^2\rangle_\theta = \frac{1}{2\pi}\int_{-\pi}^{\pi}\epsilon(\theta, u'', \xi'')^2\,d\theta. \qquad (34)$$

Assuming for mathematical simplification that the $\xi$ terms in Eq. (30) are fixed, this works out to $$sens(u) = \frac{\sqrt{F_{odd}(u)^2+F_{even}(u)^2}}{\sqrt{2}\,\Gamma} \qquad (35)$$

where the following is used $$\frac{1}{2\pi}\int_{\theta=-\pi}^{\pi} \cos(\theta)^2 \, d\theta = \frac{1}{2} \quad (36)$$

$$\frac{1}{2\pi}\int_{\theta=-\pi}^{\pi} \sin(\theta)^2 \, d\theta = \frac{1}{2} \quad (37)$$

$$\frac{1}{2\pi}\int_{\theta=-\pi}^{\pi} \sin(\theta)\cos(\theta) \, d\theta = 0. \quad (38)$$

As explained in connection with FIGS. 2A to 2C, Fizeau fringes create errors by generating additive noise sources through multiple reflections within the cavity. For example, a double-pass within the cavity results in a net sinusoidal modulation with twice the amplitude of a single reflection, because of the double reflection from the reference surface 48, and a phase of twice the phase θ because of the double reflection from the test surface 102. Thus for a given spurious reflection of integer order η=2, 3, 4 . . . we have $$u'' = \eta u \quad (39)$$

$$\xi'' = \eta \theta \quad (40)$$

The correlation of the intensity-noise phase ξ to the object phase θ slightly alters the calculation of the standard deviation, which now involves integrals of the form $$\frac{1}{2\pi}\int_{\theta=-\pi}^{\pi} [\sin(\eta\theta)\cos(\theta)]^2 \, d\theta = \frac{1}{4} \quad (41)$$

$$\frac{1}{2\pi}\int_{\theta=-\pi}^{\pi} [\cos(\eta\theta)\sin(\theta)]^2 \, d\theta = \frac{1}{4} \quad (42)$$

for integer values of η>1, in place of the integrals in Eqs. (36) and (37). The result is that the phase error attributable to a specific η>1 multiple reflection is given by $$stdev_{fiz}(\eta) = \frac{V_\eta}{V_1} \frac{sens(\eta u)}{\sqrt{2}} \quad (43)$$

where $V_\eta$ is the strength of each successive internal reflection within the Fizeau cavity.

It can be shown that $$V_2 = -V_1 \sqrt{\rho_1 \rho_2} \quad (44)$$

$$V_3 = V_1 \rho_1 \rho_2 \quad (45)$$

and so on, with the relative strength $V_n$ of each successive harmonic of order n decreasing in strength by the multiplicative factor $-\sqrt{\rho_1 \rho_2}$, where $\rho_1, \rho_2$ are the intensity reflectivities of the reference and object surfaces, respectively. Consequently, assuming based on the θ-phase dependence that the variances for the various orders η add up independently, a standard deviation of the error contribution for Fizeau fringe distortion as a function of calibration error can be expressed as $$stdev_{fiz}(u) = \frac{1}{\sqrt{2}}\sqrt{\sum_{\eta=2}^{\infty}(\rho_1 \rho_2)^{\eta-1}sens^2(\eta u)}. \quad (46)$$

Using the sensitivity as, for example, defined in Eq. 35, one can design sinusoidal PSI algorithms to specifically suppress at least the double-pass multiple-reflection error in a Fizeau cavity. The algorithm design procedure can rely on adjusting the coefficient vectors $h_{odd}$, $h_{even}$ directly, so as to have near zero sensitivity to integer multiples of the design phase shift amplitude, including most specifically twice the phase shift amplitude u, using a sensitivity curve such as discussed, for example, in connection with FIGS. 3A and 3B as a guide. The procedure may be manual, or apply optimization algorithms such as, for example, Least squares algorithms.

Two examples of algorithms optimized in such a way are described in the following in connection with FIGS. 3A and 3B. The algorithms are derived to work with interferometric data that was, for example, measured with interferometric systems such as shown in FIG. 1. For the measurement, controller 50 drives a phase shifting mechanism to provide a sinusoidal phase shift amplitude of u radians. During a full cycle of the sinusoidal phase shift, the controller stores an interference signal as a series of several intensity values, where the intensity values are acquired at sample positions arranged, for example, symmetrically about the midpoint of the sinusoidal phase shift cycle at a fixed phase difference Δα of the sinusoidal oscillation of the reference surface. The controller 50 calculates the phase difference using the intensity values as input parameters for the PSI algorithm.

Algorithms derived for this purpose include the following 12-frame algorithm for an excursion u=3.384 and a fixed phase difference Δα=π/6 on twelve intensity values $$h_{odd} = \begin{pmatrix} 1.2461 & -1.5525 & -2.5746 & 2.5746 & 1.5525 & -1.2461 \ldots \\ -1.2461 & -1.5525 & 2.5746 & -2.5746 & -1.5525 & 1.2461 \end{pmatrix} \quad (47)$$

$$h_{even} = \begin{pmatrix} 0.2707 & -2.6459 & 2.3753 & -2.3753 & 2.6459 & -0.2707 \ldots \\ -0.2707 & 2.6459 & -2.3753 & 2.3753 & -2.6459 & 0.2707 \end{pmatrix} \quad (48)$$

Figure 3A:
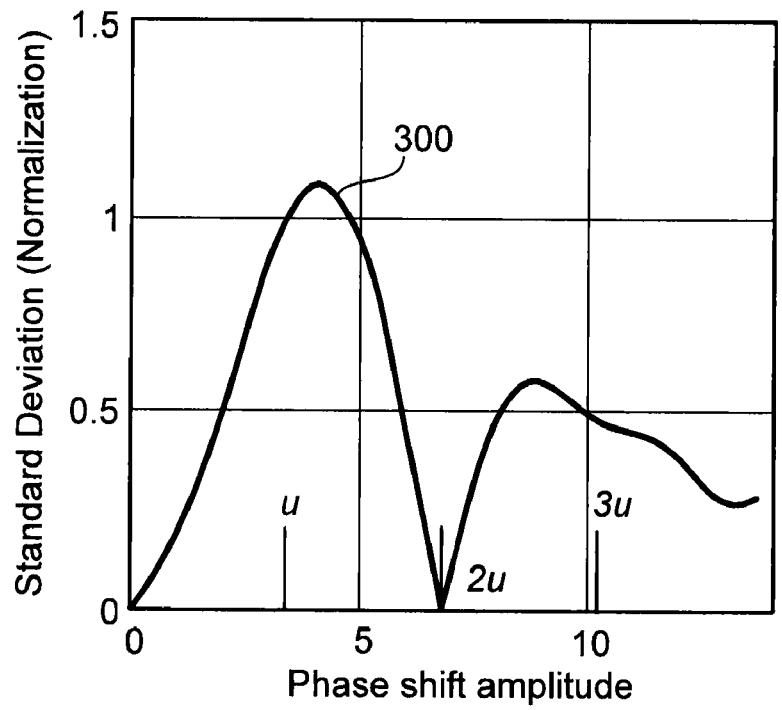
FIG. 3A is a graph of a sensitivity of an example of a 12-frame algorithm as a function of the phase-shift amplitude.

FIG. 3A shows a sensitivity curve 300 of the 12-frame sinusoidal PSI algorithm as a function of the amplitude of the sinusoidal phase shift. This sinusoidal PSI algorithm is designed specifically to have a high sensitivity at the phase amplitude u. The algorithm is further designed to suppress noise from the Fizeau double pass reflection at the phase amplitude 2 u.

Another example is the following 20-frame algorithm for an excursion u=4.18 and fixed phase difference Δα=π/10:

$$h_{odd} = \begin{pmatrix} 0.07014 & -0.02966 & -0.01048 & -0.13572 & -0.14926 \ldots \\ 0.14926 & 0.13572 & 0.01048 & 0.02966 & -0.07014 \ldots \\ -0.07014 & 0.02966 & 0.01048 & 0.13572 & 0.14926 \ldots \\ -0.14926 & -0.13572 & -0.01048 & -0.02966 & 0.07014 \end{pmatrix} \quad (49)$$

$$h_{even} = \begin{pmatrix} 0.06611 & -0.14129 & -0.01346 & -0.08822 & 0.17686 \ldots \\ -0.17686 & 0.08822 & 0.01346 & 0.14129 & -0.06611 \ldots \\ -0.06611 & 0.14129 & 0.01346 & 0.08822 & -0.17686 \ldots \\ 0.17686 & -0.08822 & -0.01346 & -0.14129 & 0.06611 \end{pmatrix} \quad (50)$$

Figure 3B:
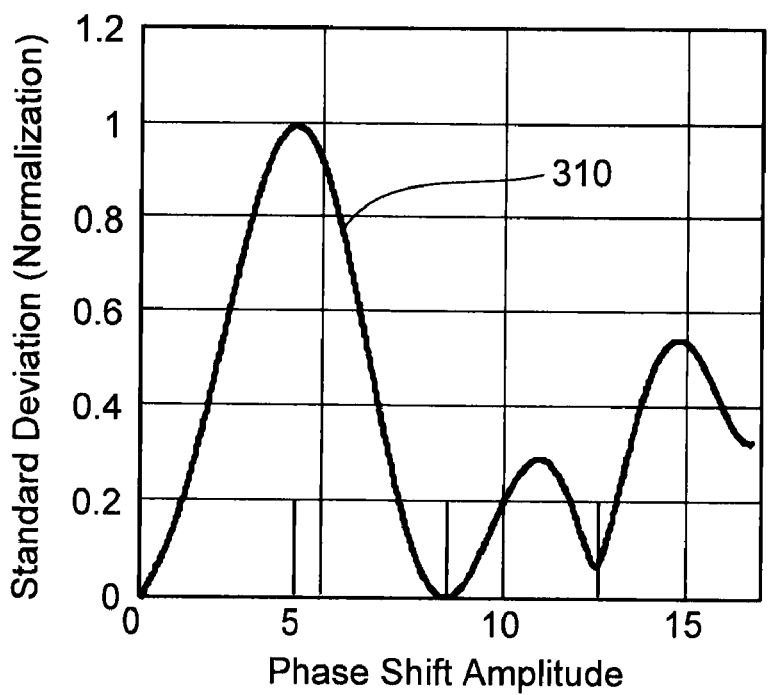
FIG. 3B is a graph of a sensitivity of an example of a 20-frame algorithm as a function of the phase-shift amplitude.

FIG. 3B shows a sensitivity curve 310 of the 20-frame sinusoidal PSI algorithm. This sinusoidal PSI algorithm is also designed specifically to have a high sensitivity at the phase amplitude u. The algorithm is further designed to suppress noise from the Fizeau double pass reflection at the phase amplitude 2 u. Moreover, the algorithm is designed to suppress noise from the Fizeau tripple pass reflections at the phase amplitude 2 u. In addition, the minimum at the phase amplitude 2 u is a flat minimum that provides noise suppression of the corresponding contributions.

Figure 4:
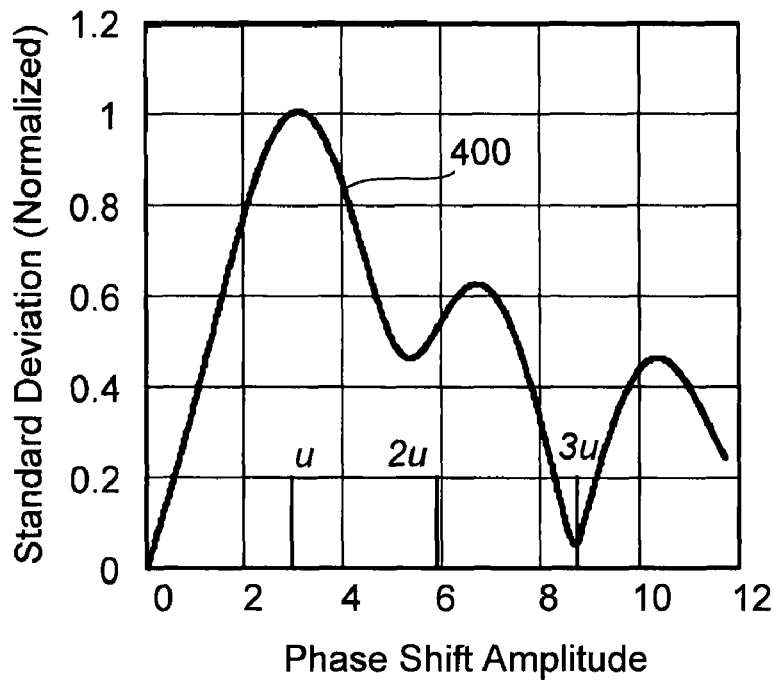
FIG. 4 is a graph of a sensitivity of an example of a 8-frame algorithm as a function of the phase-shift amplitude.

For comparison, FIG. 4 shows a sensitivity curve 400 of a 8-frame sinusoidal algorithm for an excursion u=2.93 and fixed phase difference Δα=π/4. The algorithm has a peak sensitivity at the phase amplitude u=2.93. However, sensitivity curve 400 shows also a large sensitivities at twice this amplitude 2 u=5.86 corresponding to the double-pass spurious reflection in the Fizeau cavity. Consequently, the 8-frame algorithm is highly sensitive to Fizeau multiple-pass errors and is not suitable for a laser Fizeau interferometer, although it may be appropriate for other types of interferometers that do not have this error mechanism.

The concept of a phase amplitude sensitivity as, for example, expressed by Eq. 35 can further be applied to increase the algorithms' stability against calibration errors. An important observation in this respect can be made in view of FIGS. 3A, 3B, and 4 for which the suppression of the $2^{nd}$ harmonic is principally achieved for a range of frequencies near $v''=2$. To either side of this frequency, the intensity sensitivity rises rapidly. A calibration error $v_0 \neq 1$ will cause the $2^{nd}$ harmonic $v''=2v_0$ to be different from $v=2$, resulting in measurement errors in proportion to the strength of the $2^{nd}$ harmonic. This is the origin of calibration-dependent errors related to the fundamental frequency $v_0 \neq 1$. The magnitude of this $2^{nd}$-harmonic error rapidly overwhelms all other sources of error when the phase shift is different from the expected. In some embodiments, the 20-frame algorithm can perform better than the 12-frame, given that the derivative of the sensitivity function sens(v) is zero at the $2^{nd}$ harmonic frequency $v''=2$.

Recalling from Eq. (2) as an example of a basic form of PSI algorithms $$\tan(\theta) = \frac{\Gamma_{even}}{\Gamma_{odd}} \frac{R_{odd}(\theta)}{R_{even}(\theta)}, \tag{51}$$

to account for calibration error, $R_{even,odd}(\theta)$ can be written as $$R_{odd}(v_0,\theta)=\sin(\theta)qVF_{odd}(v_0) \tag{52}$$

$$R_{even}(v_0,\theta)=\cos(\theta)qVF_{even}(v_0). \tag{53}$$

The corresponding phase error $\epsilon_{cal}$ caused by a calibration error is $$\tan(\theta + \varepsilon_{cal}) = \frac{F_{odd}(v_0)}{F_{even}(v_0)} \frac{\Gamma_{even}}{\Gamma_{odd}} \tan(\theta). \tag{54}$$

Eq. (55) can be expanded to $$\tan(\theta) + [1 + \tan^2(\theta)]\varepsilon_{cal} = \frac{F_{odd}(v_0)}{F_{even}(v_0)} \frac{\Gamma_{even}}{\Gamma_{odd}} \tan(\theta), \tag{55}$$

which upon solving for the phase error $\epsilon_{cal}$ due to a calibration error becomes $$\varepsilon_{cal}(v_0, \theta) = \frac{\tan(\theta)}{1 + \tan^2(\theta)}\left[\frac{F_{odd}(v_0)}{F_{even}(v_0)} \frac{\Gamma_{even}}{\Gamma_{odd}} - 1\right] \tag{56}$$

or $$\varepsilon_{cal}(v_0,\theta)=[\tau(v_0)-1]\sin(\theta)\cos(\theta) \tag{57}$$

where $$\tau(v_0) = \frac{F_{odd}(v_0)}{F_{even}(v_0)} \frac{\Gamma_{even}}{\Gamma_{odd}}. \tag{58}$$

Thus, the standard deviation of the phase error caused by a calibration error is $$stdev_{cal}(v_0) = \frac{1}{2\sqrt{2}}|\tau(v_0)-1|. \tag{59}$$

Assuming that the θ-phase dependence for calibration errors and errors from multiple reflections are sufficiently decorrelated to allow their standard deviations to be added by the root-sum-square method, the net error can be expressed as $$stdev(v_0)=\sqrt{stdev_{fiz}^2(v_0)+stdev_{cal}^2(v_0)} \tag{60}$$

where $stdev_{fiz}(v_0)$, $stdev_{cal}(v_0)$ are from Eqs. (47) and (59).

Thus, the phase amplitude sensitivity being the basis for Eq. (60) can further be used for optimizing algorithms with respect to calibration errors.

Figure 5:
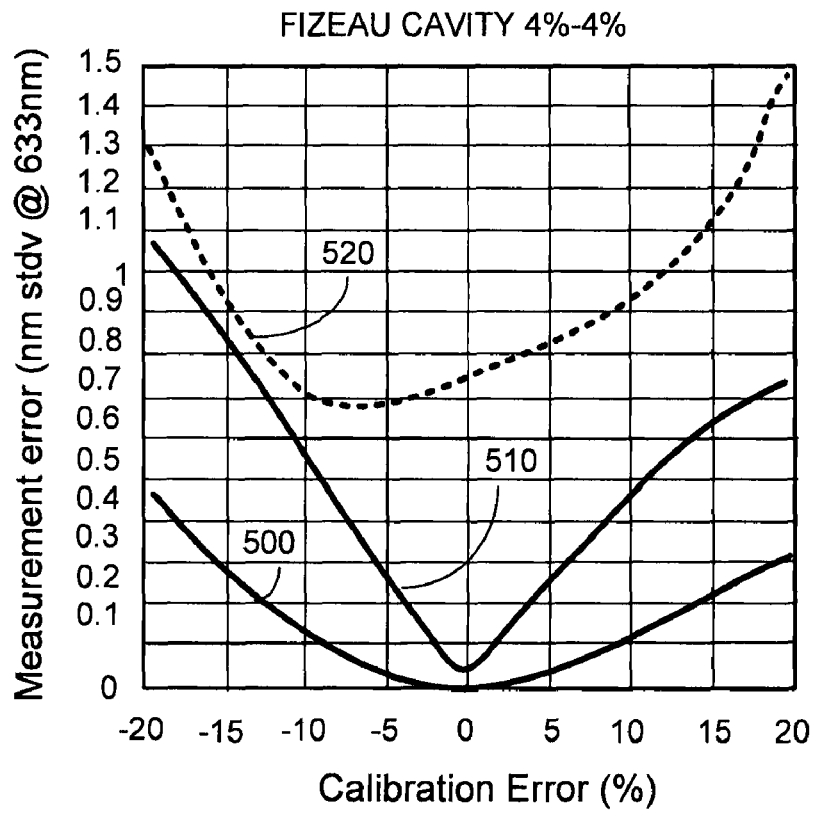
FIG. 5 is a graph comparing a calibration error of the 12-frame, 20-frame, and 8-frame algorithms of FIGS. 3A, 3B, and 4, respectively.

FIG. 5 compares the measurement errors in dependence of the calibration error for the 20-frame sinusoidal PSI algorithm (curve 500), 12-frame sinusoidal PSI algorithm (curve 510), and the prior-art 8-frame SinPSI algorithm (curve 520) modeled for a 4% reflectivity of the test and reference surfaces and for a wavelength of 633 nm. The 12- and 20-frame sinusoidal PSI algorithms are specifically designed to have low sensitivity to integer multiples of the sinusoidal phase shift amplitude, as is evident from the low error for a correctly-calibrated Fizeau (calibration error=0%). With respect to the prior-art 8-frame algorithm at 0% calibration error, the 12-frame sinusoidal PSI algorithm is more than 10× better and the 20-frame sinusoidal PSI algorithm is more than 100× better.

Furthermore, the 20-frame sinusoidal PSI algorithm is designed to be tolerant to variations in the value of the sinusoidal phase shift amplitude u arising from calibration errors or from the geometry of the Fizeau, which can lead to variations in the phase shift amplitude as a function of field position, particularly for high-NA optics. Specifically, curve 500 of the 20-frame sinusoidal PSI algorithm shows a measurement error below about 0.1 nm in the range of a calibration error of ±10%.

While the foregoing analysis is based on single measurements, in some embodiments, data acquisition is repeated over multiple cycles of the sinusoidal phase shift oscillation, thereby recording an interference signal related to changes in an intensity of the combined light, for example, on a pixel basis. Then phase differences are calculated for one or more subsets of recorded intensity values of the interference signal. In some embodiments, the phase differences are calculated for each cycle. The calculated phase differences can be averaged to reduce noise. For example, in some embodiments, the intensity data is acquired over multiple consecutive cycles and controller 60 calculates the phase difference based on intensity data acquired during a first cycle of the sinusoidal phase shift while simultaneously acquiring intensity data during the next cycle. Then, controller 60 calculates the phase difference based on intensity data acquired during the second cycle while simultaneously acquiring intensity data during the next cycle, and so on.

In some embodiments, the intensity values acquired at each sample position are then averaged over multiple cycles and controller 60 calculates the phase difference by substituting the averaged intensity values for the values $I_j$ in Eqs. (3) and (4).

Figure 6A:
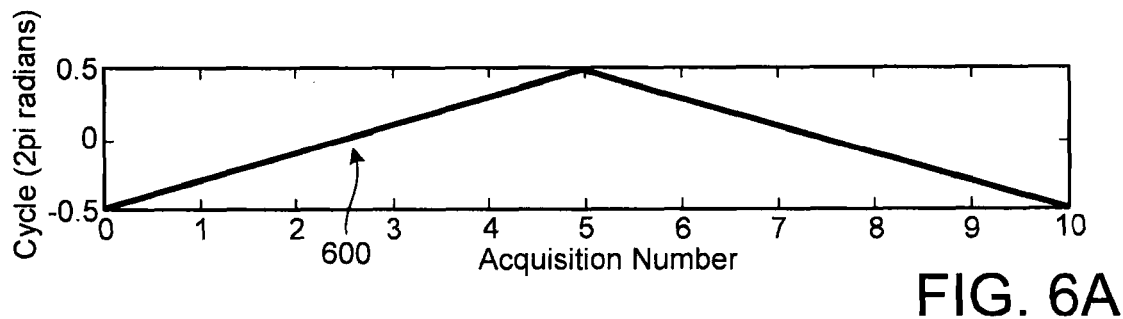
FIG. 6A is a graph illustrating a phase-shift drift for a sinusoidal phase-shift.
Figure 6B:
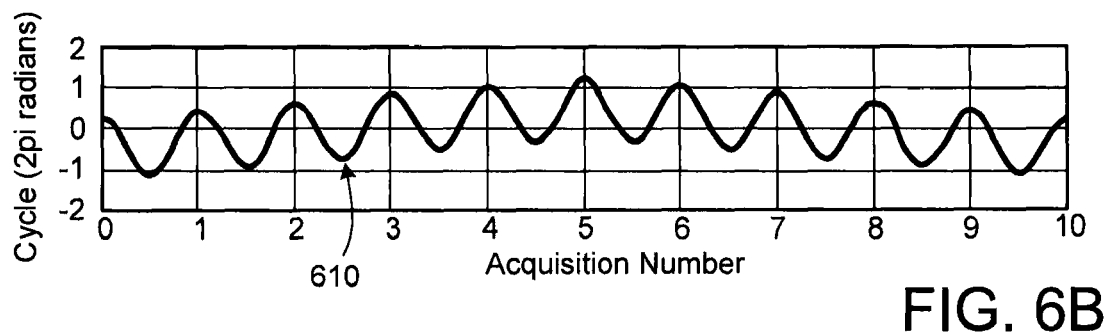
FIG. 6B is a graph of an example of a sinusoidal phase-shift including the phase-shift drift of FIG. 6A.

While the foregoing averaging approach can be sensitive to errors that are periodic with phase, in some embodiments, sinusoidal PSI applies averaging of data acquired with a varying phase offset, which can reduce errors that are periodic with phase. For example, one can replace the sinusoidal phase variation of Eq. (5) with a phase varying according to $$\phi_j = u \cos(\alpha_j) + f(t), \quad (61)$$

where f(t) is some non-constant time-varying function. For example, f(t) may be a triangular function of much lower frequency than the $\cos(\alpha_j)$ term in Eq. (61). An example of such a triangular varying phase offset is shown in FIG. 6A. FIG. 6B illustrates the corresponding phase shift that is the sum of a sinusoidal component and a time-varying function as shown in FIG. 6A, as in Eq. (62).

As explained previously for the case without phase offset variation, data acquisition is repeated over multiple cycles of the sinusoidal phase shift oscillation, wherein during the recording the phase-offset is varied according to the non-constant time varying function f(t), thereby recording an interference signal related to changes in an intensity of the combined light and related to variations in the phase-offset. Then phase differences are calculated for one or more subsets of recorded intensity values of the interference signal. The subsets can include, for example, consecutive sequences of intensity values and/or overlapping subsets of intensity values. In some embodiments, the intensity values of a subset correspond to a cycle of the sinusoidal phase shift oscillation and the phase differences are calculated for each cycle. The calculated phase differences can then be averaged to reduce noise.

In some embodiments, multiple intensity values of the interference signal of corresponding positions of the sinusoidal phase shift oscillation are averaged and controller 60 calculates a phase differences by substituting the averaged intensity values for the values $I_j$ in Eqs. (3) and (4).

The above described averaging of the phase differences can also be based on phase differences derived from averaged intensity values.

Figure 7:
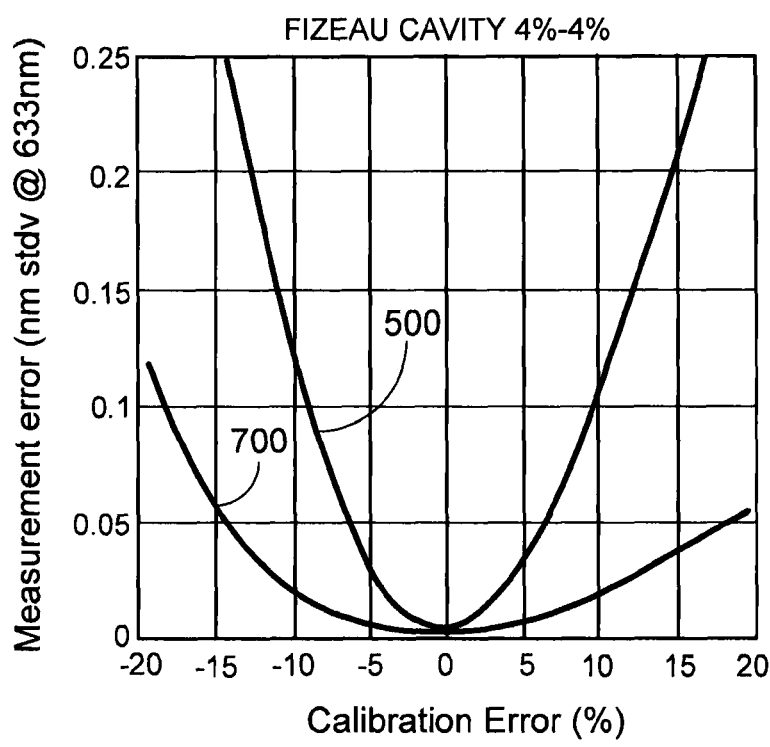
FIG. 7 is a graph comparing a calibration error of the 20-frame algorithm of FIG. 3B and an averaged 20-frame algorithm on the basis of the sinusoidal phase-shift of FIG. 6B.

Like FIG. 5, FIG. 7 shows the measurement errors in dependence of the calibration error for the 20-frame sinusoidal PSI algorithm (curve 500) and the measurement errors in dependence of the calibration error for the 20-frame sinusoidal PSI algorithm being averaged using the triangular varying phase offset of FIG. 6A (curve 700), showing the further improvement in performance gained by averaging multiple data acquisitions with a phase variation as shown in FIG. 6B. In FIG. 7 the vertical scale is 6× magnified with respect to FIG. 5.

While for the comparison in FIG. 7 a triangular offset function was applied, other functional changes of the phase offset are also possible. Examples include repeated triangularly varied phase offsets, stepwise increase and/or decrease of phase offsets, sinusoidally varying the phase offset, and random offsets.

In particular, sinusoidal PSI algorithms may be used together with e.g. Mirau, Michelson or Linnik interference objectives on interference microscopes, so as to facilitate high-speed data acquisition, or to relax requirements on the mechanical or optical phase shifting device for these instruments. For applications involving an interference microscope having an uncertain source wavelength, or having a large numerical aperture that may increase the interference fringe spacing, it can be useful to perform a first measurement to determine the equivalent wavelength λ for use in Eq. 1 and for determining the correct phase shift increment Δα. A suitable method for determining equivalent wavelength is the frequency-domain analysis approach in U.S. Pat. No. 5,398,113, although other methods such as, for example, empirically determining or calibrating the phase shift between camera frames and the corresponding equivalent wavelength, may be employed.

While the foregoing averaging based on a varying phase offset was disclosed in connection with an algorithm designed to suppress higher order Fizeau-distortions, the in connection with FIGS. 6A, 6B, and 7 described averaging of signal based on a drift of a phase offset can also be applied to other sinusoidal PSI algorithms such as, for example, the 8-frame algorithm described herein and other algorithms described in U.S. Patent Application US-2008/0180679-A1.

The forgoing examples of sinusoidal PSI algorithms illustrate the benefits of the sinusoidal PSI for laser Fizeau interferometry in particular, but also for any sinusoidally phase-shifted system in which there are potential errors related to noise at integer multiples of the expected phase shift amplitude. Thus, the interferometer for acquiring the interferometric data may be of a Fizeau-type or any type employing a sinusoidal phase shift, e.g., to facilitate more rapid data acquisition or to relax the requirements on the phase shifting device.

Figure 8:
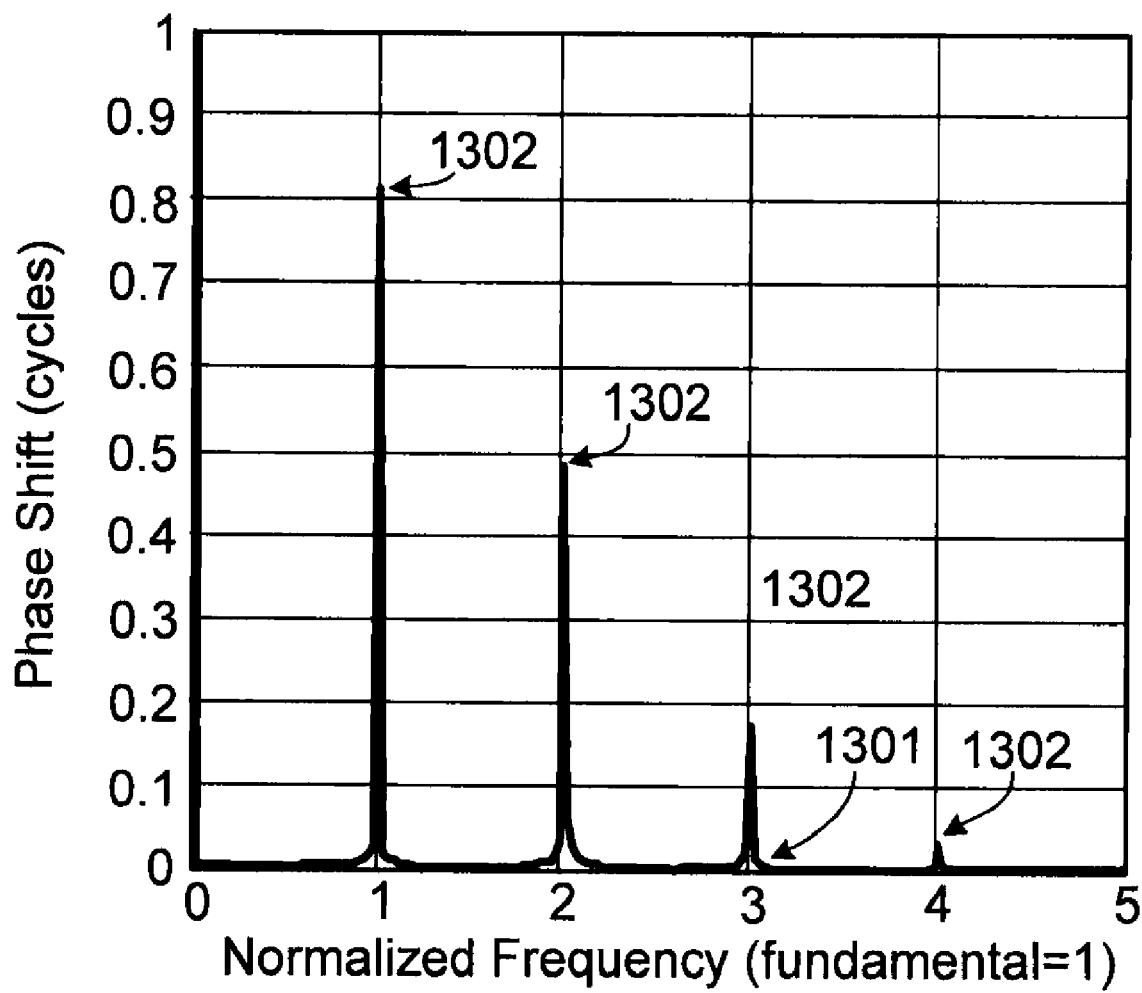
FIG. 8 is a plot of the magnitude of a Fourier Transform of an interference signal.

While the foregoing derivation of algorithms was explained in the time domain, in some embodiments, controller 50 transforms the interference signal from the time domain to the frequency domain using, for example, a Fourier Transform (e.g., a complete complex valued Fourier Transform). FIG. 8 shows the magnitude of the digital fast Fourier Transform 1301 of a simulated sinusoidal phase shift signal. The frequency domain representation 1301 in FIG. 8 shows the anticipated sequence of frequency components 1302 at harmonics of the of the sinusoidal phase shift frequency. As in the foregoing analysis, the ratio of the even harmonics to the odd harmonics provides a measure of θ. For example, if identifying the fundamental and second harmonics in FIG. 8 and measuring their magnitudes, in the first quadrant of θ (i.e., modulo π/2)

$$\tan(\theta) = \frac{\Gamma^{FT}_{odd}|G(\theta, 1)|}{\Gamma^{FT}_{even}|G(\theta, 2)|} \quad (62)$$

where $|G(\theta, \nu)|$ is the magnitude of the transformed interference signal at the $\nu^{th}$ harmonic of the sinusoidal phase shift frequency, and the normalization coefficients, determined from the theoretical signal are $$\Gamma^{FT}_{odd} = -2J_1(u)B(1) \quad (63)$$

$$\Gamma^{FT}_{even} = -2J_2(u)B(2). \quad (64)$$

To cover the full 2π range of θ, controller 50 further analyzes the Fourier Transform to first solve for φ and then determine the appropriate quadrant.

Additionally, in some embodiments, controller 50 analyzes the detailed Fourier Transform to determine information not only about the phase θ but also about the timing offset φ and the excursion u. This technique can compensate for unknown or uncertain values of the parameters φ, u.

While in system 100 the sinusoidal phase-shift is generated by mechanically displacing an optical elements, other approaches for mechanically causing a sinusoidal phase shift are also possible. For example, one can vary the position of the test object 100 alone or in combination with the position of reference optics 42.

Figure 9:
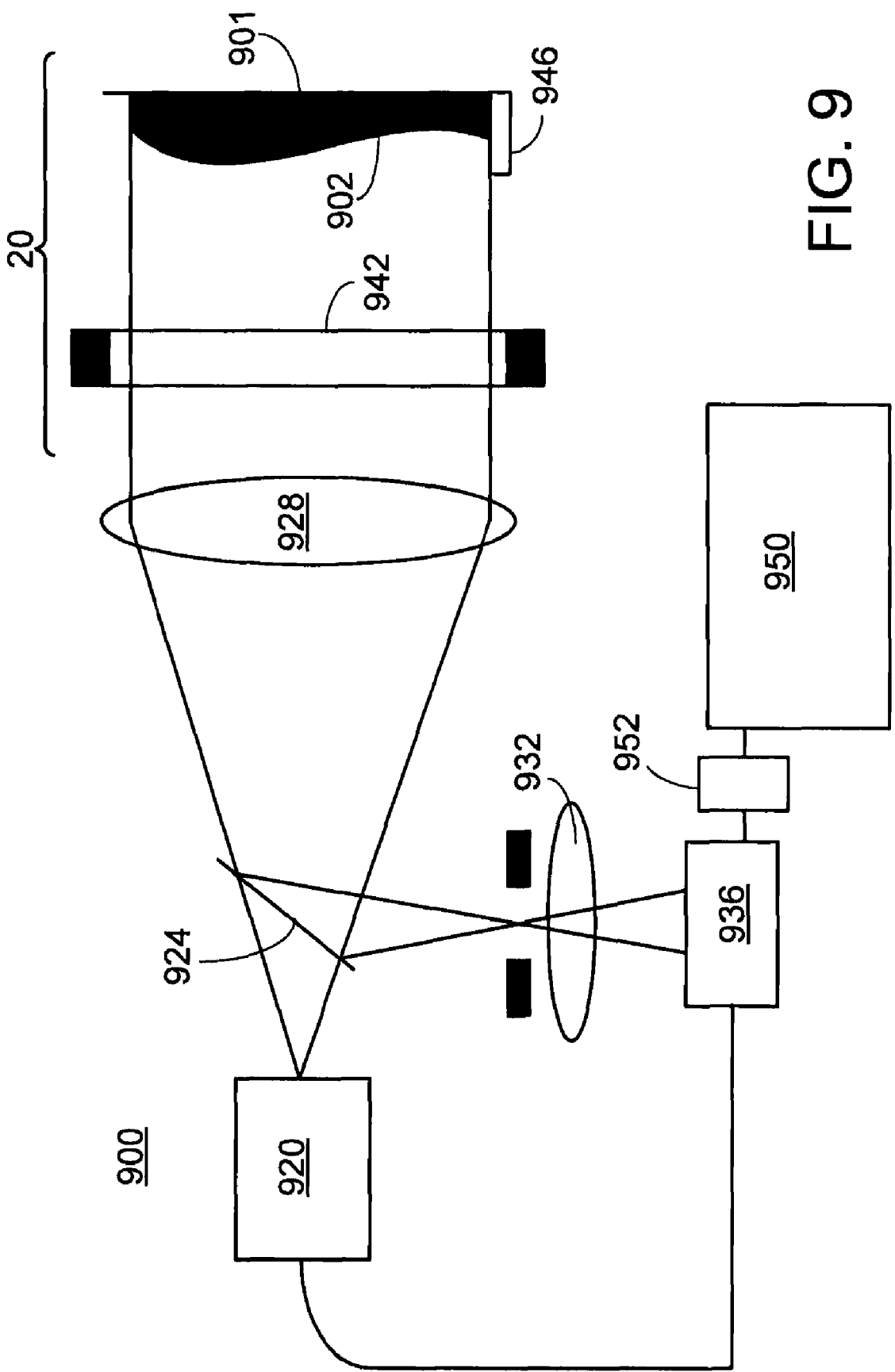
FIG. 9 is a schematic diagram of an embodiment of a sinusoidal phase-shifting interferometer system with wavelength tuned phase shifting.

Another approach for generating a phase shift is wavelength tuning. FIG. 9 shows a schematic diagram of a sinusoidal phase-shifting interferometric system 900 featuring a wavelength tunable light source 920 (e.g., a tunable diode laser). Interferometric system 900 does not rely on sinusoidal displacement of the position of a reference surface 942 or of a measurement object 901 for generating the sinusoidal phase-shifting. Instead, tunable light source 920 is driven by a controller 950 to provide light of sinusoidally varying wavelength. In this fashion, a sinusoidal phase shift is introduced between the reference and measurement light, where the sinusoidal phase shifting frequency depends of the frequency at which the wavelength of the laser source is varied.

Reference object 901 is mounted in a mount 946 to align, for example, a test surface 902 of measurement object 901 with reference surface 942. While interferometric system 10 shown in FIG. 1 is based on a spherical cavity, interferometric system 900 is based on a planar Fizeau cavity 940. Controller 950 stores and analyzes interference signals using a CCD camera 936, a frame grabber 952. Interferometric system 900 includes further a collimating lens 928 to collimate light from tunable light source 920, a beam splitter 928, and an imaging lens 932 to image light exciting the Fizeau cavity 40 onto CCD camera 936.

In the Fizeau geometry, the reference and test light travel unequal optical path lengths. In general, in unequal path interferometers, the phase difference between the reference and test light depends on both the optical path difference, and the wavelength of the light. Thus, varying the wavelength of the light in time shifts the relative phase between the reference and test light at a phase shift frequency which depends on both the rate at which the wavelength is varied and the optical path length difference between the reference and test light paths. Note that although examples of Fizeau interferometers are shown herein, other types of unequal path length interferometer may be used. Phase-shifting interferometry based on such wavelength tuning is described in, for example, U.S. Pat. No. 6,359,692 entitled "METHOD AND SYSTEM FOR PROFILING OBJECTS HAVING MULTIPLE REFLECTIVE SURFACES USING WAVELENGTH-TUNING PHASE-SHIFTING INTERFEROMETRY" by Peter de Groot, the contents of which are incorporated herein by reference.

In general, the above described interferometer systems may be used to measure various characteristics of a measurement object including, for example, surface profile, topography, or thin film structure. The above described techniques can be used to measure one or more characteristic of the test object that manifests itself in an interference signal. In certain embodiments, the above described techniques can be used to measure for example, optically under-resolved features, complex thin films, varying material types, etc. Applications can further include optical testing such as lithography testing, testing of commercial contact lenses and molds.

In some embodiments, the interferometer system may be used to determine optical wavefront shape or quality. Furthermore, the system can be used on measurement or reference objects with various geometries, for example, with plano, spherical, or aspheric geometries. In some embodiments, test light is transmitted through the test object and is subsequently combined with the reference light.

Moreover, while the concepts are described herein in connection with a Fizeau type interferometric system, similar concepts can be applied to interference microscopes, or interferometric system of different geometries such as, for example, Linnik, Mirau, Fabry-Perot, Twyman-Green, point-diffraction, Michelson, or Mach-Zeder geometries. For example, in interferometers where errors related the harmonics of phase shift amplitude are present, they can be addressed in a manner similar to the manner described herein.

In some embodiments, the measurement object is mounted on the translatable stage, and the displacement of its test surface produces the sinusoidal phase shift. In some embodiments, both the measurement and reference objects can be mounted on movable stages and be moved together or separately to generate the sinusoidal phase shift.

In certain embodiments, the sinusoidal phase shift frequency is, for example, about 50 Hz or more, about 200 Hz or more, or about 1 kHz or more. Embodiments featuring camera systems described herein can employ a sinusoidal phase shift frequency greater than 100 kHz or even greater than 1 MHz.

In general, the phase difference information or other measured characteristics can be output in a variety of ways. In some embodiments, the information can be output graphically or numerically to an electronic display or a printer. In certain embodiments, the spatial information can be output to memory (e.g., to random access memory or written to non-volatile magnetic, optical, or other memory). In some embodiments, the information can be output to a control system, such a wafer handling control system, which can adjust its operation based on the spatial information. For example, the system can adjust the position or orientation of the measurement object based on the information.

Any of the functions described above in connection with the phase shifting interferometer (e.g., generating a phase shift frequency, controlling one or more modulators, controlling a wavelength tuned light source, etc), the camera (e.g., accumulation or storage of interference pattern data, transfer of data between accumulators, synchronization with a phase shift frequency, control of shutters or other optical elements, etc.), and subsequent data analysis can be implemented in hardware or software, or a combination of both. For example, the methods can be implemented in computer programs using standard programming techniques following the method and figures described herein. Program code can be applied to input data to perform the functions described herein and generate output information. The output information can be applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis method can also be implemented as a computer-readable storage medium, configured with a computer program, where the storage medium so configured causes a computer to operate in a specific and predefined manner to perform the functions described herein.

In general, the above discussion refers to sinusoidal phase shifting. However, the term sinusoidal phase shift is to be understood to include phase shifts that deviate from perfect sinusoid phase shifts. For example, an error, which results from the deviation from a perfect sinusoid, may be predicted, for example, by using the formalism described herein. For a given embodiment, as long as this predicted error is not so large as to preclude, for example, determining the phase θ to a desired level of accuracy, the imperfect sinusoidal phase shift is suitable.

Although several specific algorithms are presented as examples above, it is to be understood that, in some embodiments, other algorithms may be used. For example, as discussed above, different values of weights $h_{odd}$ and $h_{even}$ may be selected, based on a model of the interference signal and considerations such as, for example, the types and characteristics of errors to be compensated. Moreover, while, for example, the filter functions and sensitivity function are derived in a specific mathematical description, similar definitions can be applied in other mathematical descriptions.

Accordingly, other embodiments are within the scope of the following claims.

What is claimed is:

1. A method, comprising:
   combining reference light reflected from a reference surface with test light reflected from a test surface to form combined light, the test and reference light being derived from a common source;
   sinusoidally varying a phase between the test light and reference light, where the sinusoidal phase variation has an amplitude u;
   recording at least one interference signal related to changes in an intensity of the combined light in response to the sinusoidal variation of the phase;
   determining information related to the phase using a phase shifting algorithm that has a sensitivity that varies as a function of the sinusoidal phase shift amplitude, where the sensitivity of the algorithm at 2 u is 10% or less of the sensitivity of the algorithm at u.

2. The method of claim 1, wherein the sensitivity characterizes how the phase shifting algorithm responds to the interference signal as a function of the amplitude u.

3. The method of claim 1, wherein the sensitivity of the algorithm at 2 u is 5% or less of the sensitivity of the algorithm at u.

4. The method of claim 1, wherein the sensitivity of the algorithm at 2 u is 2% or less of the sensitivity of the algorithm at u.

5. The method of claim 1, wherein the sensitivity of the algorithm at 2 u is 1% or less of the sensitivity of the algorithm at u.

6. The method of claim 1, wherein the sensitivity of the algorithm at N u is 10% or less of the sensitivity of the algorithm at U, where N is an integer greater than 2.

7. The method of claim 1, wherein the sensitivity of the algorithm at N u is 5% or less of the sensitivity of the algorithm at U, where N is an integer greater than 2.

8. The method of claim 1, wherein the sensitivity of the algorithm at N u is 2% or less of the sensitivity of the algorithm at u, where N is an integer greater than 2.

9. The method of claim 1, wherein the sensitivity of the algorithm at N u is 1% or less of the sensitivity of the algorithm at U, where N is an integer greater than 2.

10. The method of claim 1, wherein the sensitivity of the algorithm has a minimum close to 2 u and in a range from 2 u±0.2 u, the sensitivity is 10% or less of the sensitivity of the algorithm at u.

11. The method of claim 1, wherein the phase shifting algorithm has a sensitivity to contributions to the combined light from test light that makes a double pass between the test and reference surfaces that is 10% or less of the sensitivity of the algorithm to contributions to the combined light from test light that makes a single pass between the test and reference surfaces.

12. The method of claim 1, wherein the phase shifting algorithm is a function of a plurality of values of the interference signal and coefficients $h_{odd}$ and $h_{even}$, where $h_{odd}$ and $h_{even}$ are sensitive to the odd and even harmonics of the sinusoidal phase variation frequency.

13. The method of claim 12, wherein the phase shifting algorithm is a function of a ratio of the coefficients $h_{odd}$ to the coefficients $h_{even}$.

14. The method of claim 12, wherein the phase shifting algorithm determines a phase value, θ, of the interference signal according to the equation $$\tan(\theta) = \frac{\sum_j (h_{odd})_j I_j}{\sum_j (h_{even})_j I_j},$$

where j=0, 1, . . . , P−1 and $I_j$ are intensity samples of the combined light composing the interference signal acquired during P corresponding phase shifts.

15. The method of claim 14, wherein the coefficients $h_{odd}$ and $h_{even}$ are selected subject to the constraints $$\sum_j (h_{odd})_j (h_{even})_j = 0,$$

$$\sum_j (h_{odd})_j \cos[v(\alpha_j + \varphi)] = 0 \quad \text{for } v = 2, 4, 6 \ldots$$

and $$\sum_j (h_{even})_j \cos[v(\alpha_j + \varphi)] = 0 \quad \text{for } v = 1, 3, 5 \ldots.$$

wherein the sinusoidal phase variation is of the form $\phi_j = u \cos(\alpha_j)$, where $\alpha_j = j\Delta\alpha + \Delta\alpha/2$ and $\Delta\alpha = 2\pi/P$.

16. The method of claim 12, wherein the sensitivity of the phase shifting algorithm is determined based on the coefficients $h_{odd}$ and $h_{even}$.

17. The method of claim 12, wherein the sensitivity of the phase shifting algorithm is determined based on a filter function for the odd harmonics, $F_{odd}(u)$, and a filter function for the even harmonics, $F_{even}(u)$.

18. The method of claim 12, wherein the sensitivity is expressed as a sensitivity function, sens(u), which is given by $$sens(u) = \frac{\sqrt{F_{odd}(u)^2 + F_{even}(u)^2}}{2\Gamma}$$

where Γ is a constant.

19. The method of claim 18, wherein the filter function $F_{odd}(u)$ is a function of odd-ordered Bessel functions and the filter function $F_{even}(u)$ is a function of even-ordered Bessel functions.

20. The method of claim 1, wherein u is greater than π/2 radians.

21. The method of claim 1, wherein the recording comprises recording a plurality of interference signals, each corresponding to a different location of the test surface.

22. The method of claim 1, wherein the recording comprises detecting an interference pattern formed by the combined light using a multi-element detector.

23. The method of claim 1, wherein the test and reference light is combined using a Fizeau interferometer.

24. The method of claim 1, wherein the phase is sinusoidally varied by varying an optical path length difference between the test and reference surfaces.

25. The method of claim 1, wherein the phase is sinusoidally varied by varying a wavelength of the test and reference light.

26. The method of claim 1, wherein the information comprises a phase of the interference signal.

27. The method of claim 1, wherein the information comprises a profile of the test surface.

28. The method of claim 1, further comprising modifying the test surface based on the information.

29. The method of claim 28, wherein modifying the test surface comprises modifying a shape of the test surface.

30. The method of claim 1, wherein the test surface is a surface of an optical element.

31. The method of claim 30, wherein the optical element comprises a lens, a mirror, or an optical flat.

32. A method, comprising:
    combining reference light reflected from a reference surface with test light reflected from a test surface to form combined light, the test and reference light being derived from a common source;
    sinusoidally varying a phase between the test light and reference light;
    recording at least one interference signal based on a modulation of the combined light in response to varying the phase;
    determining information related to the phase using a phase shifting algorithm that has a sensitivity to contributions to the combined light from test light that makes a double pass between the test and reference surfaces that is 10% or less of the sensitivity of the algorithm to contributions to the combined light from test light that makes a single pass between the test and reference surfaces.

33. A system, comprising:
    an interferometer which during operation combines test light from a test surface with reference light from a reference surface to form combined light, where the test and reference light are derived from a common source;
    a phase shifting component which during operation introduces a sinusoidal phase shift between the test light and reference light, where the sinusoidal phase variation has an amplitude u;
    a detector positioned to detect the combined light and provide at least one interference signal based on the modulation of the combined light beam in response to varying the phase; and
    an electronic controller coupled to the phase shifting component and the detector, wherein the electronic controller is configured to determine information related to the phase during operation of the system, where the electronic controller determined the information using a phase shifting algorithm that has a sensitivity that varies as a function of the sinusoidal phase shift amplitude, where the sensitivity of the algorithm at 2 u is 10% or less of the sensitivity of the algorithm at u.

34. The system of claim 33, wherein the interferometer is a Fizeau interferometer.

35. The system of claim 33, wherein the phase shifting component is the common source, the common source being a wavelength tunable light source.

36. The system of claim 33, wherein the phase shifting component is a transducer coupled to the test surface or the reference surface.

37. A method, comprising:
    combining reference light reflected from a reference surface with test light reflected from a test surface to form combined light, the test and reference light being derived from a common source;
    sinusoidally varying a phase between the test light and reference light, where the sinusoidal phase variation has an amplitude u;
    recording at least one interference signal related to changes in an intensity of the combined light in response to the sinusoidal variation of the phase;
    determining information related to the phase using a phase shifting algorithm that has a sensitivity that varies as a function of the sinusoidal phase shift amplitude, wherein the sensitivity of the algorithm has a minimum close to 2 u and in a range from 2 u+−0.2 u, the sensitivity is 10% or less of the sensitivity of the algorithm at u to suppress calibration errors in u.

* * * * *

UNITED STATES PATENT AND TRADEMARK OFFICE
CERTIFICATE OF CORRECTION

PATENT NO. : 7,948,637 B2
APPLICATION NO. : 12/408121
DATED : May 24, 2011
INVENTOR(S) : Peter De Groot Page 1 of 1

It is certified that error appears in the above-identified patent and that said Letters Patent is hereby corrected as shown below:

Column 23, line 51 in claim 6, delete "U" and insert --u--.

Column 23, line 54 in claim 7, delete "U" and insert --u--.

Column 23, line 60 in claim 9, delete "U" and insert --u--.

Column 24, between lines 55 and 60, after $sens(u) = \frac{\sqrt{F_{odd}(u)^2 + F_{even}(u)^2}}{2\Gamma}$ insert --,--.

Column 26, line 43 in claim 37, delete "2 u+-0.2 u," and insert --2 $u\pm$ 0.2$u$--.

Signed and Sealed this
Ninth Day of August, 2011

David J. Kappos
*Director of the United States Patent and Trademark Office*